US006400853B1

(12) United States Patent
Shiiyama

(10) Patent No.: US 6,400,853 B1
(45) Date of Patent: *Jun. 4, 2002

(54) IMAGE RETRIEVAL APPARATUS AND METHOD

(75) Inventor: Hirotaka Shiiyama, Machida (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/042,692

(22) Filed: Mar. 17, 1998

(30) Foreign Application Priority Data

Mar. 19, 1997 (JP) ............................................. 9-066833
Jul. 15, 1997 (JP) ............................................. 9-190162

(51) Int. Cl.[7] ................................................. G06K 9/60
(52) U.S. Cl. ........................ 382/305; 382/195; 358/403; 707/2
(58) Field of Search ................................. 382/305–306, 382/209, 173–180, 215, 218, 195, 164, 190; 707/1–6, 500, 104.1; 358/403–404

(56) References Cited

U.S. PATENT DOCUMENTS

| 5,129,011 A | | 7/1992 | Nishikawa et al. ......... 382/173 |
| 5,159,667 A | * | 10/1992 | Borrey et al. ............... 707/500 |
| 5,606,690 A | * | 2/1997 | Hunter et al. .................. 707/5 |
| 5,652,881 A | | 7/1997 | Takahashi et al. ........ 707/104.1 |
| 5,805,746 A | * | 9/1998 | Miyatake et al. ............ 382/305 |
| 5,913,205 A | * | 6/1999 | Jain et al. ....................... 707/2 |

FOREIGN PATENT DOCUMENTS

| DE | 4 002 179 | 8/1990 | ............. G06K/9/34 |
| EP | 0 643 358 | 3/1995 | ............. G06F/17/30 |
| JP | 8241335 A | 9/1996 | ............. G06F/17/30 |
| JP | 8249349 A | 9/1996 | ............. G06F/17/30 |

OTHER PUBLICATIONS

"An Image Database System with Fast Image Indexing Capability Based on Color Histograms" Proceedings of the Region 10 Annual International Conference (Tenco, Singapore, Aug. 22–26, 1994, vol. 1, No. Conf. 9, Aug. 22, 1994, Chan T K Y, pp. 407–408.
Patent Abstracts of Japan, vol. 97, No. 1, Jan. 31, 1997 & JP 08 249349 A (Sakauchi Masao), Sep. 27, 1996.

* cited by examiner

Primary Examiner—Leo Boudreau
Assistant Examiner—Ishrat Sherali
(74) Attorney, Agent, or Firm—Fitzpatrick, Cella, Harper & Scinto

(57) ABSTRACT

An image feature amount extraction unit segments an image into a plurality of blocks and calculates the feature amount of each block. A feature amount label string generation unit adds a label to each block in accordance with the feature amount acquired for the block and arranges the labels on the basis of a predetermined block sequence to generate a label string. In retrieval, the similarity between the label string of a specified image and that of an image to be compared is calculated, and an image whose similarity exceeds a predetermined value is output as a retrieval result. In this way, similar image retrieval can be performed in consideration of the arrangement of feature amounts of images, and simultaneously, similar image retrieval can be performed while absorbing any difference due to a variation in photographing condition or the like.

31 Claims, 24 Drawing Sheets

FIG.3

| IMAGE ID | IMAGE DATA |
|---|---|
| | |
| | |
| | |
| ⋮ | ⋮ |

FIG.7A

| 1 | 2 | 4 |
|---|---|---|
| 3 | 5 | 7 |
| 6 | 8 | 9 |

FIG.7B

| 1 | 3 | 6 |
|---|---|---|
| 2 | 5 | 8 |
| 4 | 7 | 9 |

FIG.7C

| 4 | 2 | 1 |
|---|---|---|
| 7 | 5 | 3 |
| 9 | 8 | 6 |

FIG.8

| IMAGE ID | FULL PATH FILE NAME | LABEL STRING | OTHER IMAGE ATTRIBUTES |
|---|---|---|---|

| LABEL STRING ID (RETRIEVAL KEY) | LABEL STRING (RETRIEVAL KEY) | IMAGE ID GROUP | |
|---|---|---|---|
| LABEL STRING ID1 | 1 1 2 3 1 3 2 · · · | IMAGE ID1 | IMAGE ID3 |
| LABEL STRING ID2 | 1 1 2 3 1 4 4 · · · | IMAGE ID2 | IMAGE ID4 |
| · · · | · · · | · · · | · · · |

FIG.11

| LABEL COMPONENT (RETRIEVAL KEY) | LABEL STRING ID | |
|---|---|---|
| 1 | LABEL STRING ID1 | LABEL STRING ID3 |
| 2 | LABEL STRING ID1 | LABEL STRING ID5 |
| ... | ... | ... |

FIG.12

|   | 1 | 2 | 3 | 4 | 5 | 6 | 7 | 8 | · · · · |
|---|---|---|---|---|---|---|---|---|---------|
| 1 | 0 | 1 | 1 | 5 | 1 | 5 | 7 | 7 | · · · · |
| 2 |   | 0 | 2 | 1 | 1 | 7 | 2 | 5 | · · · · |
| 3 |   |   | 0 | 7 | 1 | 1 | 5 | 2 | · · · · |
| 4 |   |   |   | 0 | 1 | 9 | 1 | 7 | · · · · |
| ⋮ |   |   |   |   |   |   |   |   |         |

FIG.13A

| SPECIFIED IMAGE | 1 | 1 | 2 | 3 | 1 | 3 | 4 | 4 | 1 |
|---|---|---|---|---|---|---|---|---|---|
| IMAGE TO BE COMPARED | 1 | 1 | 3 | 2 | 2 | 4 | 4 | 5 | 2 |

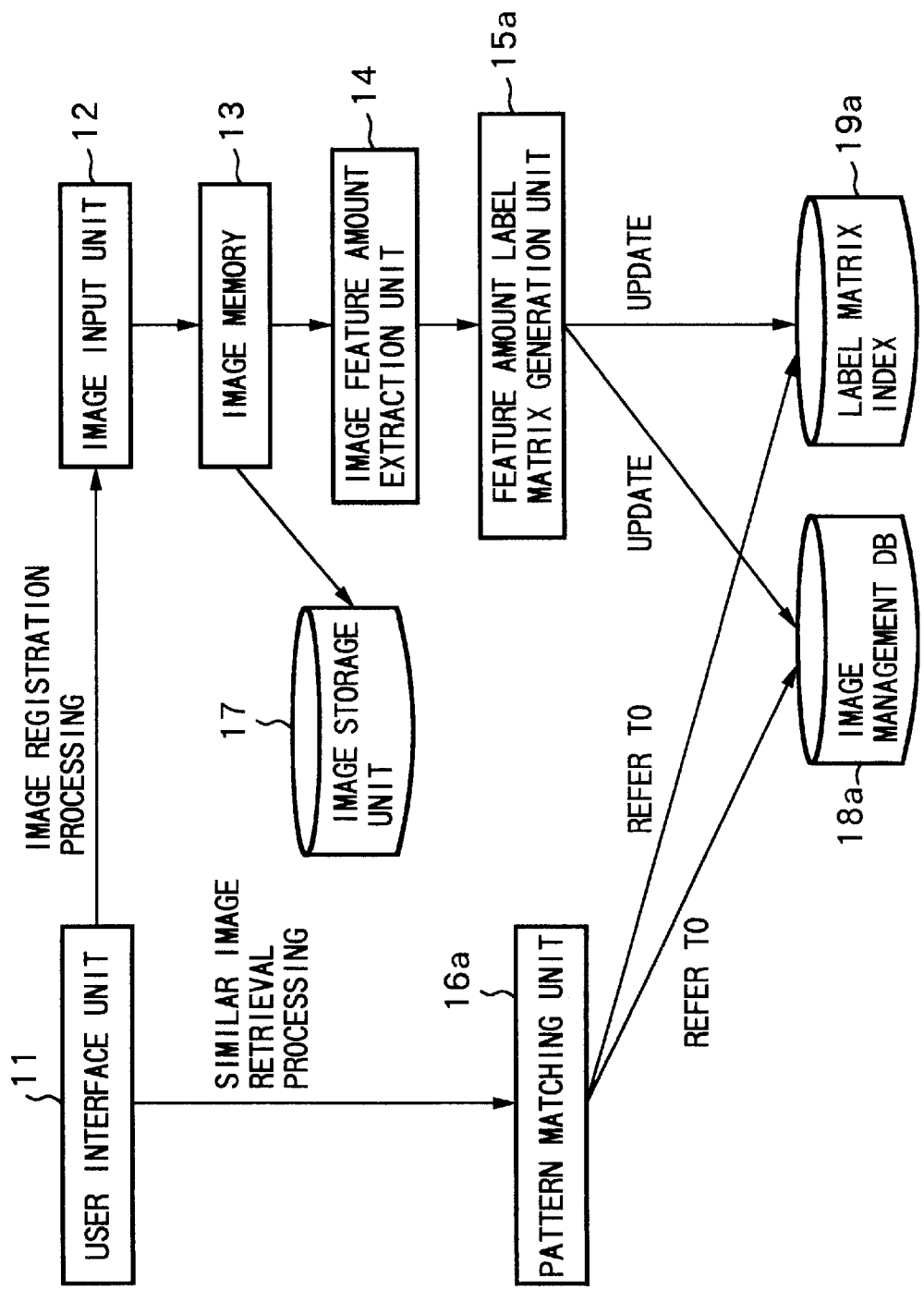

FIG.16A

| 1 | 2 | 3 |
|---|---|---|
| 4 | 5 | 6 |
| 7 | 8 | 9 |

FIG.16B

| 3 | 2 | 1 |
|---|---|---|
| 6 | 5 | 4 |
| 9 | 8 | 7 |

FIG.16C

| 7 | 8 | 9 |
|---|---|---|
| 4 | 5 | 6 |
| 1 | 2 | 3 |

FIG.16D

| 9 | 8 | 7 |
|---|---|---|
| 6 | 5 | 4 |
| 3 | 2 | 1 |

FIG.16E

| 1 | 2 | 3 | 4 |
|---|---|---|---|
| 9 | 10 | 11 | 12 |
| 5 | 6 | 7 | 8 |
| 13 | 14 | 15 | 16 |

FIG.17

| IMAGE ID | FULL PATH FILE NAME | LABEL MATRIX | OTHER IMAGE ATTRIBUTES |
|---|---|---|---|

FIG.18

| LABEL MATRIX ID (RETRIEVAL KEY) | LABEL MATRIX (RETRIEVAL KEY) | IMAGE ID GROUP | |
|---|---|---|---|
| LABEL MATRIX ID1 | 1 1 2 3 1 3 2 · · · | IMAGE ID1 | IMAGE ID3 |
| LABEL MATRIX ID2 | 1 1 2 3 1 4 4 · · · | IMAGE ID2 | IMAGE ID4 |
| · · · | | | |

FIG.20

| LABEL COMPONENT (RETRIEVAL KEY) | LABEL MATRIX ID | |
|---|---|---|
| 1 | LABEL MATRIX ID1 | LABEL MATRIX ID3 |
| 2 | LABEL MATRIX ID1 | LABEL MATRIX ID5 |

IMAGE RETRIEVAL APPARATUS AND METHOD

BACKGROUND OF THE INVENTION

1. Field of the Invention

The present invention relates to an image retrieval apparatus and method of retrieving an image.

2. Description of the Related Art

Conventionally, various techniques of retrieving an image have been proposed. Many similar image retrieval techniques for natural images, which are put into practice to some extent, use color information as an image feature amount. Most of these techniques calculate the histogram associated with color information and retrieve an image using the RGB ratio or combination of majority colors in images.

In these techniques, however, the retrieval accuracies are not always high because positional information of colors is lost. For example, Japanese Patent Laid-Open No. 8-249349 discloses pattern matching using feature amounts (representative colors) of a plurality of blocks obtained by segmenting each image. With this technique, however, the distance in feature amount between blocks of two images to be matched must be calculated, so an enormous amount of calculation is required. Especially, when representative colors are used as feature amounts, three data, i.e., R, G, and B data must be handled, and calculation becomes more complex. In addition, since the feature amounts themselves are used to compare images, similar image retrieval is disabled only when the image angle or object position changes although the comparison accuracy rises. More specifically, appropriate image retrieval while ensuring some degree of ambiguity by absorbing some difference in image feature amount due to a change in image angle or object position or photographing conditions, i.e., so-called robust similar image retrieval cannot be performed.

When a natural image is to be retrieved using the conventional technique, normally, keywords are added to images in advance, and image retrieval is performed on the basis of the keywords. However, keyword addition is labor-intensive. Additionally, an image having no keyword must be manually selected by displaying thumbnail images, resulting in cumbersome retrieval.

SUMMARY OF THE INVENTION

The present invention has been made in consideration of the above problem, and has as its object to provide an image retrieval apparatus and method which allow high-speed similar image retrieval in consideration of the image feature amount arrangement.

It is another object of the present invention to provide an image retrieval apparatus and method which allow similar image retrieval by effectively absorbing a change in image due to a variation in photographing condition such as a photographing angle or photographing magnification.

In order to achieve the above objects, according to an aspect of the present invention, there is provided an image retrieval apparatus comprising addition means for segmenting an image into a plurality of blocks and adding a label to a feature amount acquired in correspondence with each block, generation means for arranging labels added by the addition means on the basis of a predetermined block sequence to generate a label string, storage means for storing the label string generated by the generation means in correspondence with the image, and retrieval means for performing image retrieval on the basis of the label string stored in the storage means.

According to another aspect of the present invention, in the image retrieval apparatus, the label string represents a two-dimensional label matrix, and the retrieval means comprises first matching means for making a label string extracted from a label matrix of a retrieval specified image in units of rows correspond to a label string extracted from a label matrix of an image to be compared in units of rows by Dynamic Programming (DP) matching to obtain a row array of the image to be compared, and second matching means for obtaining, by DP matching, a similarity between a row array of the retrieval specified image and the row array obtained by the first matching means.

With this arrangement, two-dimensional DP matching can be performed.

It is still another object of the present invention to enable quick similar image retrieval by representing a feature amount group by one symbol and calculating the similarity between labels to reduce the similarity calculation amount.

It is still another object of the present invention to perform satisfactory similar image retrieval by representing similar feature amounts by one label.

It is still another object of the present invention to more effectively perform similar image retrieval by applying a technique such as DP matching or fuzzy nondeterministic automaton which allows certain ambiguity in label positions.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a view for explaining the image data storage state in an image storage unit 17;

FIGS. 7A to 7C are views for explaining block sequences in generating a label string;

FIG. 8 is a view showing an example of the data structure of an image management DB record;

FIG. 9 is a view showing an example of the data structure of a label system index;

FIG. 11 is a view showing an example of the data structure of a label component index according to the first embodiment;

FIG. 12 is a view showing a penalty matrix between labels used to compare label strings to obtain similarity;

FIGS. 13A to 13C are views for explaining calculation of the distance between label strings by DP matching;

FIG. 14 is a block diagram showing the functional arrangement of an image retrieval apparatus according to the second embodiment;

FIGS. 16A to 16E are views for explaining block sequences in generating a label matrix in the second embodiment;

FIG. 17 is a view showing an example of the data structure of an image management DB record according to the second embodiment;

FIG. 18 is a view showing an example of the data structure of a label system index according to the second embodiment;

FIG. 20 is a view showing an example of the data structure of a label component index according to the second embodiment;

DETAILED DESCRIPTION OF THE PREFERRED EMBODIMENTS

Preferred embodiments of the present invention will now be described in detail in accordance with the accompanying drawings.

[First Embodiment]

Figure 1:
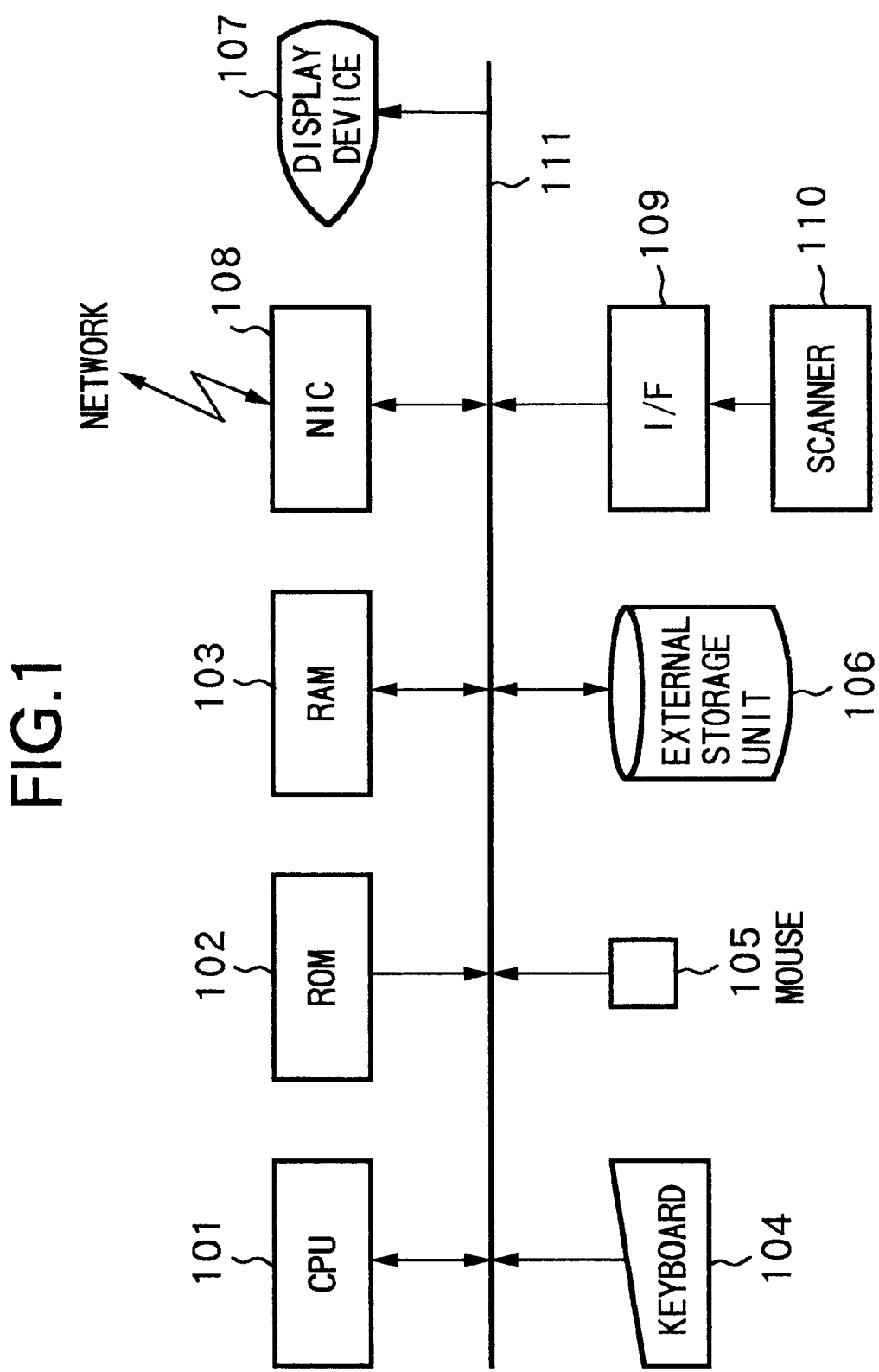
FIG. 1 is a block diagram showing the control arrangement of an image retrieval apparatus according to the first embodiment.

FIG. 1 is a block diagram showing the control arrangement of an image retrieval apparatus according to the first embodiment. Referring to FIG. 1, a CPU 101 executes various control operations in the image retrieval apparatus of this embodiment. A ROM 102 stores a bootstrap program to be executed in starting the apparatus and various data. A RAM 103 stores a control program to be executed by the CPU 101 and also provides a work area for the CPU 101 to execute various control operations. A keyboard 104 and a mouse 105 provide various environments for user inputs.

An external storage unit 106 is constituted by a hard disk, a floppy disk, or a CD-ROM. A network interface 108 allows communication with devices on a network. Reference numeral 109 denotes an interface; and 110, a scanner for reading an image. A bus 111 connects the above-described elements. The program for realizing processing shown in flow charts (to be described later) may be stored in the ROM 102 or loaded from the external storage unit 106 to the RAM 103.

In the above arrangement, the scanner 110 or external storage unit 106 may be substituted with a device on the network.

Figure 2:
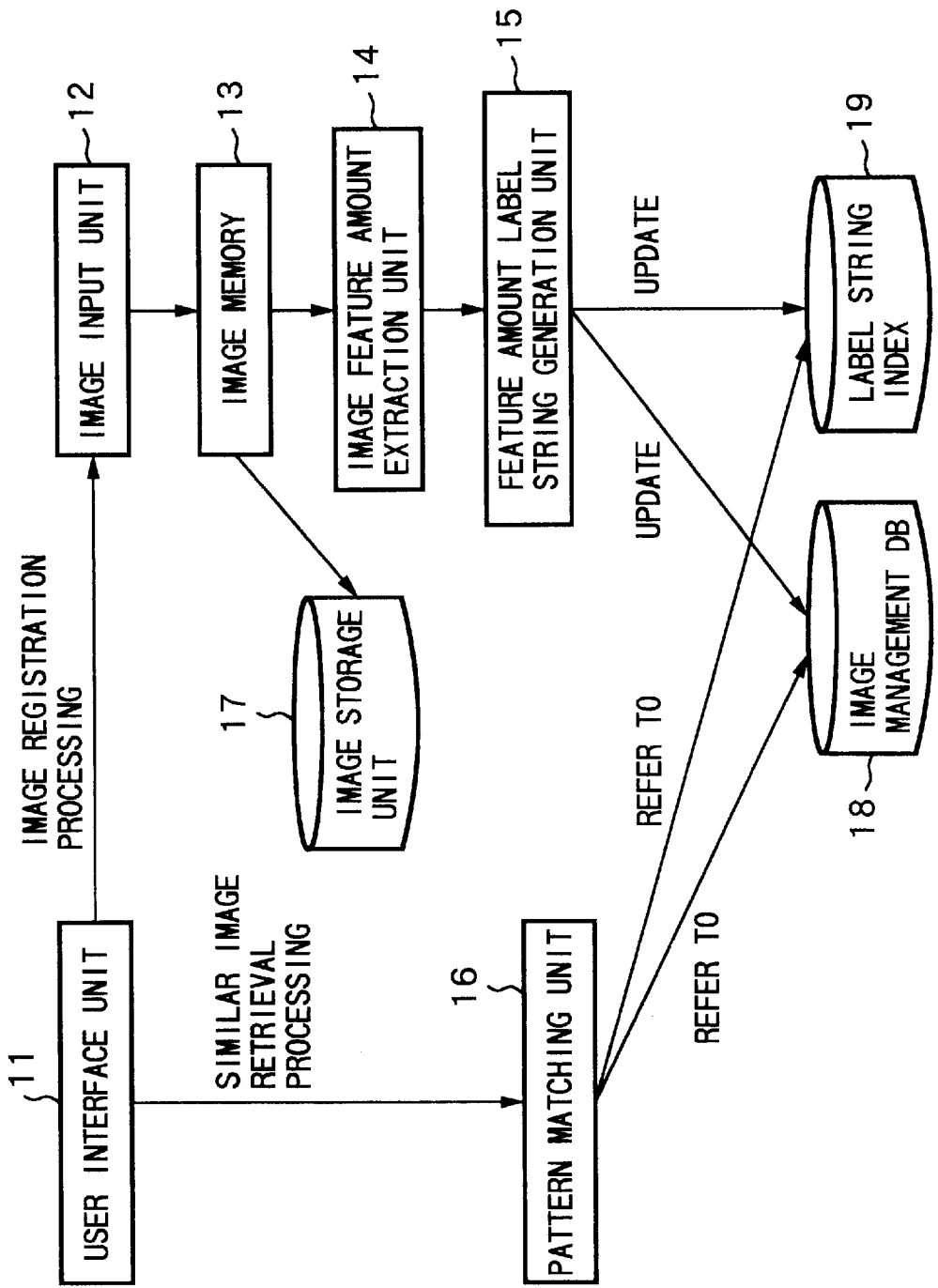
FIG. 2 is a block diagram showing the functional arrangement of the image retrieval apparatus according to the first embodiment.

FIG. 2 is a block diagram showing the functional arrangement of the image retrieval apparatus of the first embodiment. Referring to FIG. 2, a user interface unit 11 detects various operation inputs from the user using a display device 107, the keyboard 104, and the mouse 105. An image input unit 12 reads an image with the scanner 110. An image memory 13 stores image data obtained from the image input unit 12 in a predetermined area of the RAM 103. An image feature amount extraction unit 14 extracts the feature amount of the image stored in the image memory 13 following a procedure to be described later. A feature amount label string generation unit 15 generates a label string on the basis of the feature amount obtained by the image feature amount extraction unit 14. A pattern matching unit 16 calculates the similarity between a user specified image and images stored in an image storage unit 17 on the basis of their label strings to search and retrieve a similar image.

Figure 3:
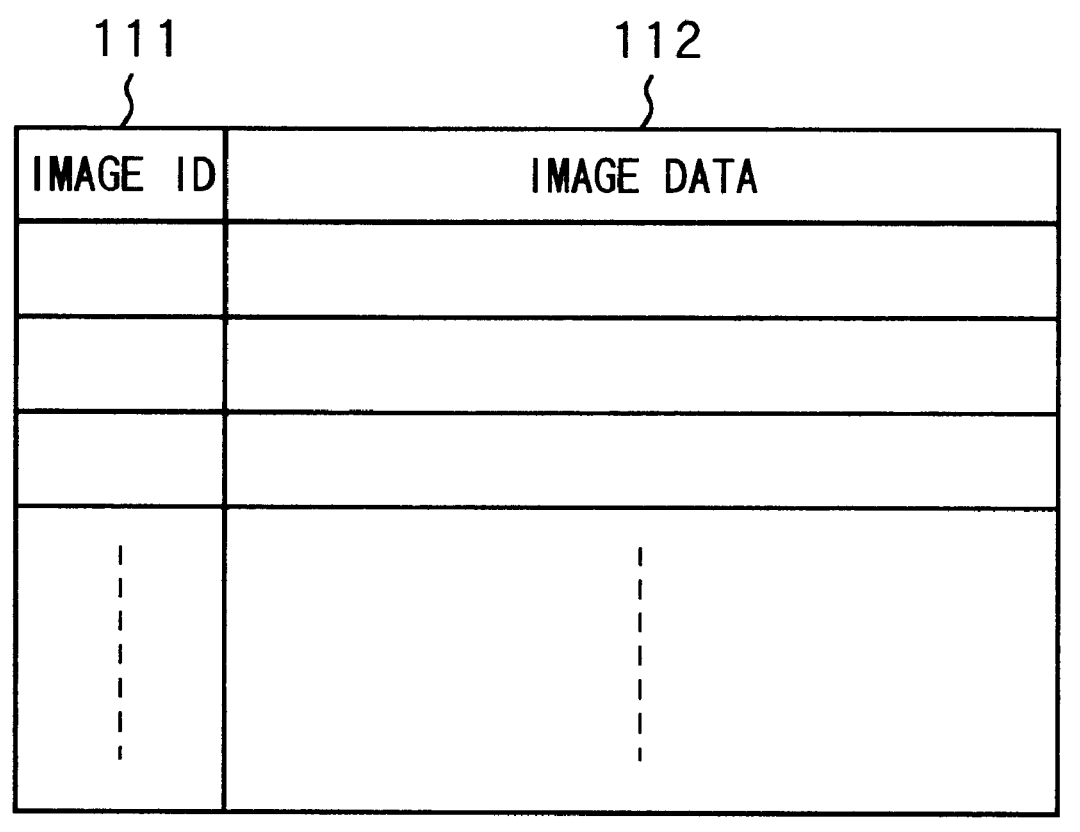

The image storage unit 17 stores image data obtained from the image input unit 12 or the like. FIG. 3 is a view for explaining the image data storage state in the image storage unit 17. An image ID 111 is added to each image data 112, so one image ID 111 and one image data 112 are paired and held in the image storage unit 17. An image management database (to be referred to as an image management DB hereinafter) 18 manages image data stored in the image storage unit 17 in the data format shown in FIG. 8. A label string index 19 stores a label system index file shown in FIG. 9 or label component index file shown in FIG. 11. Use of these indices will be described later with reference to the flow chart in FIG. 10.

The operation of the image retrieval apparatus according to the first embodiment with the above arrangement will be described below. The following description will be made by exemplifying processing in a three-dimensional color space while employing colors, three colors of red (R), green (G), and blue (B), in this case, as image feature amounts.

[Image Registration Processing]

Figure 4:
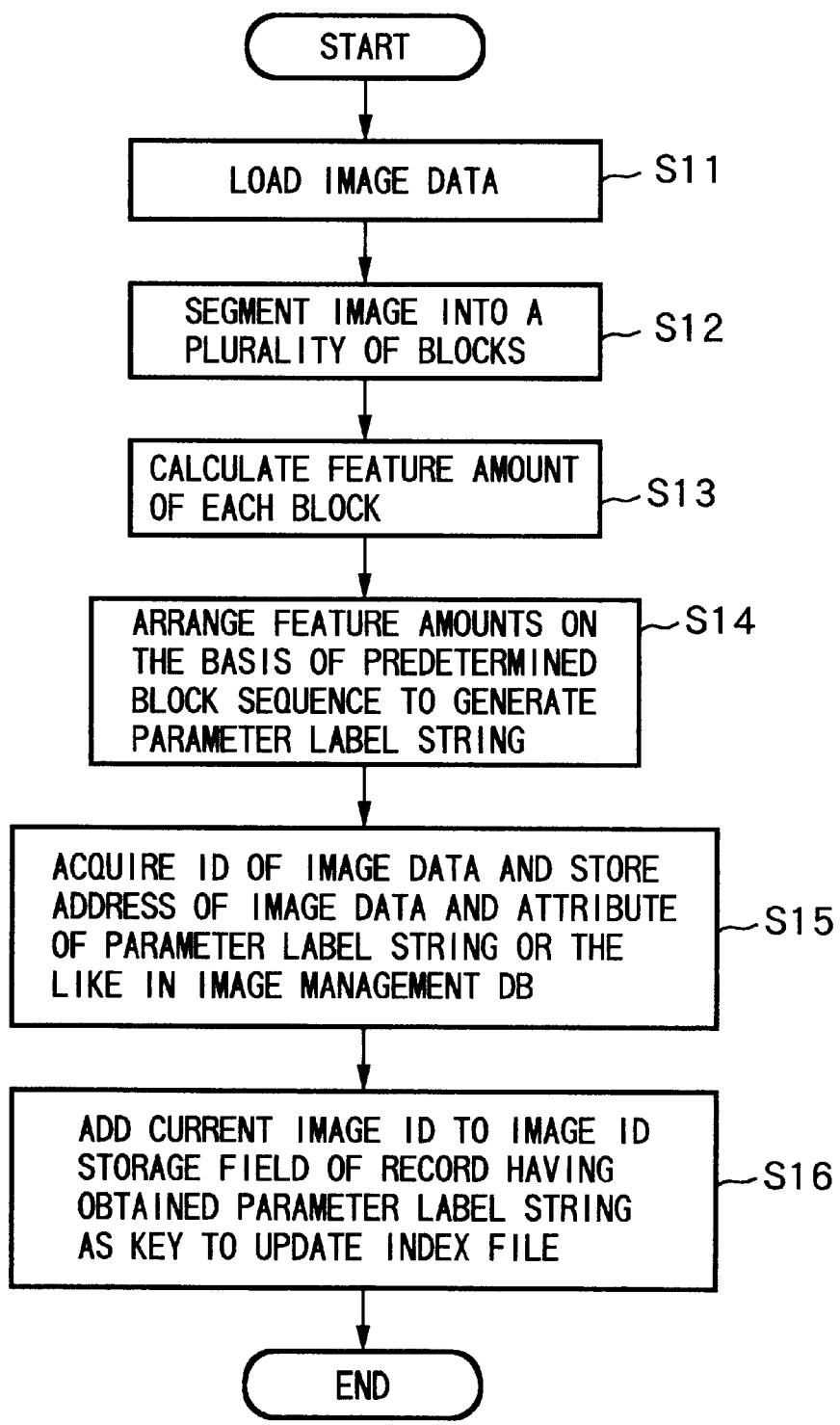
FIG. 4 is a flow chart showing the procedure of image registration processing according to the first embodiment.
Figure 5:
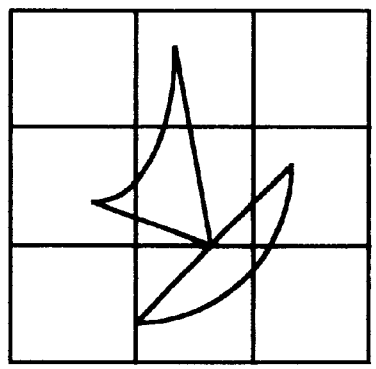
FIG. 5 is a view showing an example of image block division according to the first embodiment.

Image registration processing will be described first. FIG. 4 is a flow chart showing the procedure of image registration processing according to the first embodiment. In step S11, an image is loaded using the image input unit 12 in accordance with an instruction from the user through the user interface unit 11 and held in the image memory 13. In step S12, this image is segmented into a plurality of blocks. In this embodiment, the image is broken up into a plurality of blocks in the vertical and horizontal directions. FIG. 5 is a view showing an example of image block division according to this embodiment. As shown in FIG. 5, in this embodiment, the image is segmented into 3×3 blocks, i.e., a total of 9 blocks for the descriptive convenience. In step S13, the feature amounts of the segmented blocks are calculated, so labels of the obtained feature amounts are generated according to the following procedure.

The division into 3×3 blocks in this embodiment is merely an example for the descriptive convenience. Actually, a natural image is preferably segmented into 10×10 or more blocks. For example, an image of a product with a white background is preferably segmented into 13×13 or more blocks.

Figure 6:
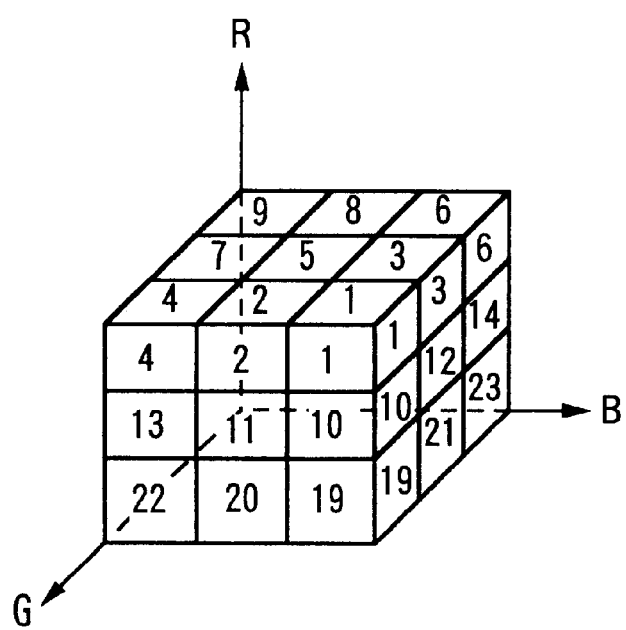
FIG. 6 is a view for explaining a multidimensional feature amount space according to the first embodiment.

FIG. 6 is a view for explaining a multidimensional feature amount space according to this embodiment. The multidimensional feature amount space (RGB color space) is segmented into a plurality of blocks (color blocks), i.e., cells (color cells), and unique labels with serial numbers are added to the respective cells (color cells). The multidimensional feature amount space (RGB color space) is segmented into a plurality of blocks to absorb the fine difference in feature amount (color).

For the multidimensional feature amount space, the image feature amount is not directly used. Instead, the average and variance of each parameter is standardized (normalized) by experiments, and then, orthogonal transformation such as principal component analysis is performed to obtain a significant dimension. Note that the "significant dimension" is a dimension defined by a principal component axis having a high contribution ratio in principal component analysis.

In step S13, each of segmented blocks obtained in step S12 is subjected to predetermined image feature amount calculation to determine a cell on the multidimensional feature amount space, to which the block belongs, and obtain a corresponding label. All blocks are subjected to this processing. More specifically, each segmented image block is subjected to calculation for obtaining color cells to which pixels of the image block belong. The label of a color cell with the highest frequency is determined as the parameter label (color label) of the segmented image block. This processing is performed for all blocks.

The parameter labels are added to the blocks in the above-described manner. In step S14, the parameter labels added to the blocks are arranged on the basis of a predetermined block sequence to generate a parameter label string (to be referred to as a label string hereinafter). FIGS. 7A to 7C are views for explaining block sequences in generating a label string. The parameter labels are arranged in accordance with numbers in the segmented image blocks to generate a label string.

In FIG. 7A, the segmented blocks are obliquely scanned from the upper right side to the lower left side. This is because the influence of any fine difference or shift in angle between images to be compared is minimized by obtaining continuous label strings as many as possible with high expectation along the object to be subjected to similarity retrieval. Consequently, in cooperation with the pattern matching unit 16 (to be described later), strings can be compared with each other while being less affected by a shift in both the vertical and horizontal directions.

The following scanning methods can be applied to this embodiment.

Horizontal scanning (four scanning methods are available; e.g., scanning from the left side to the right side is performed from the upper side to the lower side, or scanning from the left side to the right side is performed from the lower side to the upper side).

Vertical scanning (four scanning methods are available; e.g., scanning from the upper side to the lower side is performed from the left side to the right side).

Oblique scanning (oblique scanning methods in two directions are available for each of starting points at the four corners, so a total of eight scanning methods are available including those shown in FIGS. 7A to 7C).

Zigzag scanning (zigzag scanning is employed in, e.g., JPEG. Two zigzag scanning methods are available for each of starting points at four corners, so a total of eight scanning methods are available). In this embodiment, the scanning method to be employed is determined from the following viewpoints.

(1) In this embodiment, label strings are subjected to time series comparison, so reversal of this sequence is not preferable. All images must be scanned by a predetermined scanning method to generate label strings.

(2) Blocks close to each other are preferably arranged close even in a label string.

(3) When the labels of blocks associated with the object to be retrieved can be detected as soon as possible and continuously scanned as long as possible, matching is facilitated.

(4) Even when the object is moved or changed in angle, the label array must be prevented from being excessively changed. The scanning method to be employed need satisfy the above conditions. Especially, assuming that many objects of interest are located at the center of images, this embodiment employs oblique scanning as a method with high expectation for detecting blocks including the object of interest as soon as possible and scanning the object of interest as long as possible. In this embodiment, oblique scanning from the upper right side to the lower left side as shown in FIG. 7A is employed. However, scanning as shown in FIGS. 7B or 7C may be employed, as a matter of course.

In step S15, the label string or image data obtained in the above manner is stored in the image storage unit 17, the image management DB 18, and the label string index 19. More specifically, an image ID is acquired for the image data loaded in step S11, and the image ID and image data are paired and stored in the image storage unit 17. An image management DB record shown in FIG. 8 is generated in correspondence with the image ID and registered in the image management DB 18. In step S16, the image ID is registered in the label string index 19 storing a record (label system index shown in FIG. 9) in which an image ID group is stored in a variable length record while setting label strings as retrieval keys. If the label string has not been registered, a new record is generated, and a label string ID is added to the label string, so that the label string and corresponding image ID are registered. If the label string has already been registered, the image ID is additionally registered in the image ID group. By using such a label system index, an image ID corresponding to a given label string can be quickly obtained.

Image registration processing has been described above.

[Similar Image Retrieval Processing]

Figure 10:
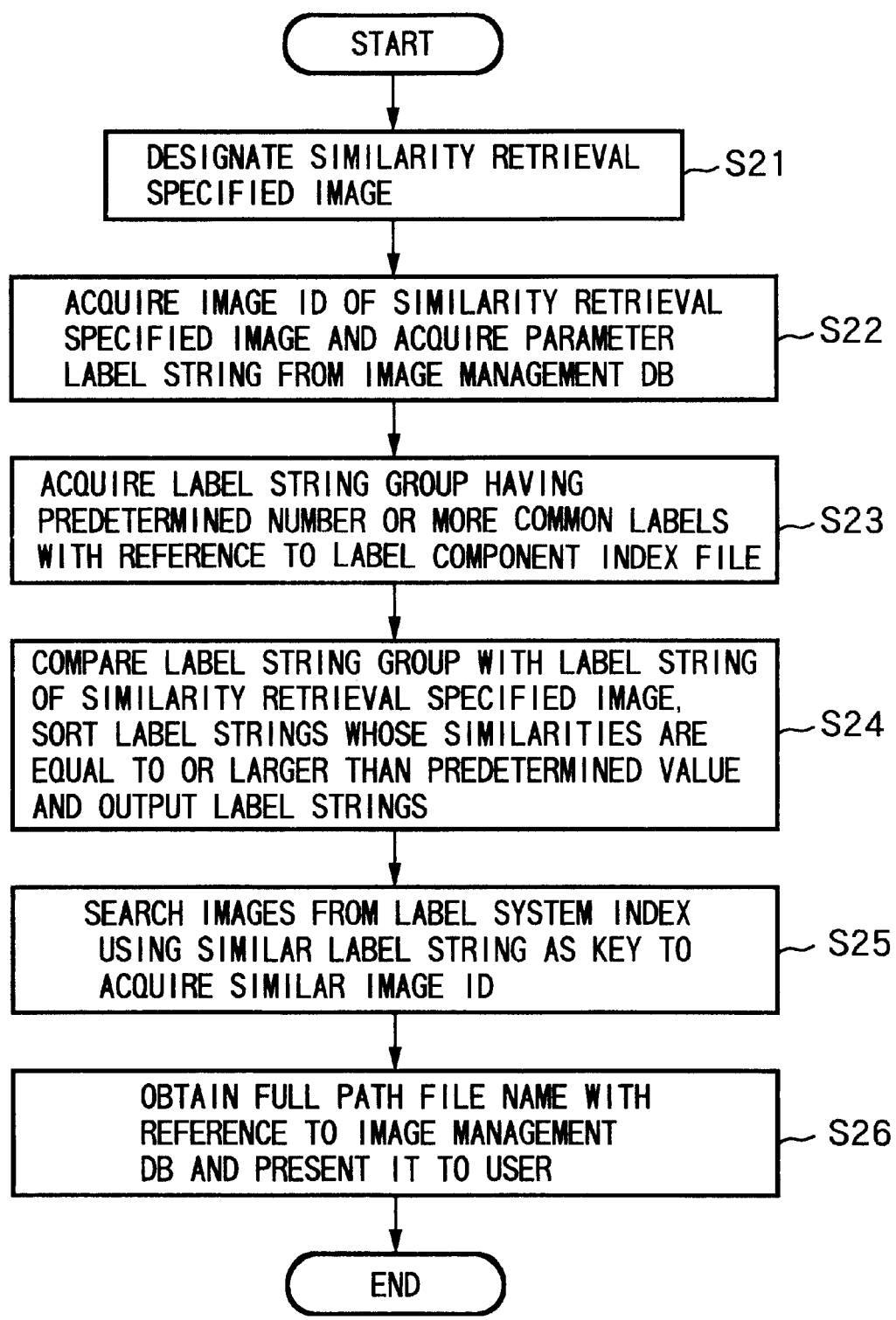
FIG. 10 is a flow chart for explaining the procedure of similar image retrieval according to the first embodiment.

Similar image retrieval processing will be described next with reference to the flow chart in FIG. 10. FIG. 10 is a flow chart for explaining the procedure of similar image retrieval processing. In this embodiment, the label string group of already registered images is obtained from the label system index at the time of initialization in advance, and a label component index file (FIG. 11) having label components as keys is generated and stored in the label string index 19. In this case, the time of initialization means the time of starting the system or the time of starting an application. Even when a new image is registered in the image DB, the label component index is generated. FIG. 11 is a view showing the data structure of the label component index. As shown in FIG. 11, each label component of the label component index has an address group (string ID group) corresponding to the label strings having the labels. The label component index file need not be regenerated until image registration, deletion, or change need be reflected on the label component index. Note that, the label component index may be updated or added when a new image is registered.

In step S21, a similar image retrieval specified image is designated from the user interface unit 11. In step S22, the image ID of the designated similarity retrieval specified image (to be referred to as a specified image hereinafter) is acquired, and the label string (color label string in this example) of the specified image is acquired from the image management DB 18.

In step S23, a label string group (label strings in the label system index) including a predetermined number or more labels similar to the label string of the specified image is acquired with reference to the label component index file. If the label string of the specified image is compared with all label strings of registered images, the processing speed lowers. To prevent this, similar label strings (label string group including a predetermined number or more labels having small penalties to the label string of the specified image, the penalty will be discussed later referring to FIG. 12) are extracted in advance, and then, each of these label strings is compared with the label string of the specified image, thereby improving the processing speed. If a low processing speed is permitted, the label string of the specified image may be compared with all label strings of registered images to perform highly accurate retrieval (in this case, step S23 is omitted).

The following method is available as a method of extracting images using the above-described label component index file. In this embodiment, a label string including nine labels is used, and images including three labels (fourth to sixth labels) at the center of this label string are extracted. This is because, generally, the feature information of the image is present at the central portion of the image.

In step S24, each of the label strings acquired in step S23 is compared to the label string of the specified image to calculate similarity. The label strings are sequentially output from the closest one to the label string of the specified image together with their similarities as a detection result.

The method of performing similarity comparison between label strings (calculation of similarity) will be described.

FIG. 12 is a view showing a penalty matrix between labels used in label string comparison for obtaining the similarity. A smaller value in the matrix indicates higher similarity. For example, the penalty between label 2 and label 6 is "7". The penalty between identical labels is "0", as a matter of course. This matrix is used to perform distance determination corresponding to the similarity between labels. More specifically, in this embodiment, since the RGB color space is used as the feature amount space, distance determination corresponding to the similarity between colors can be made.

Figure 13B:
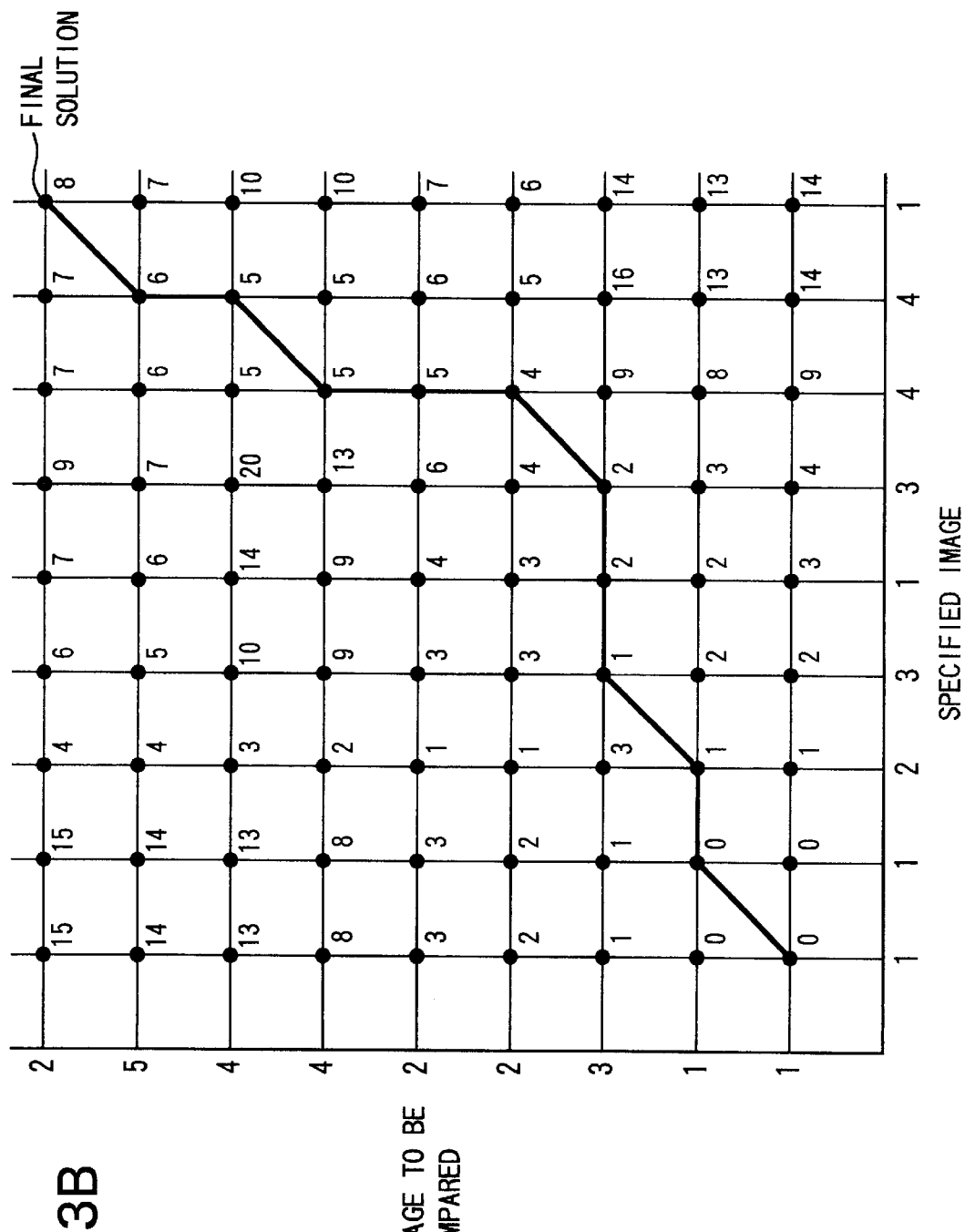
Figure 13C:
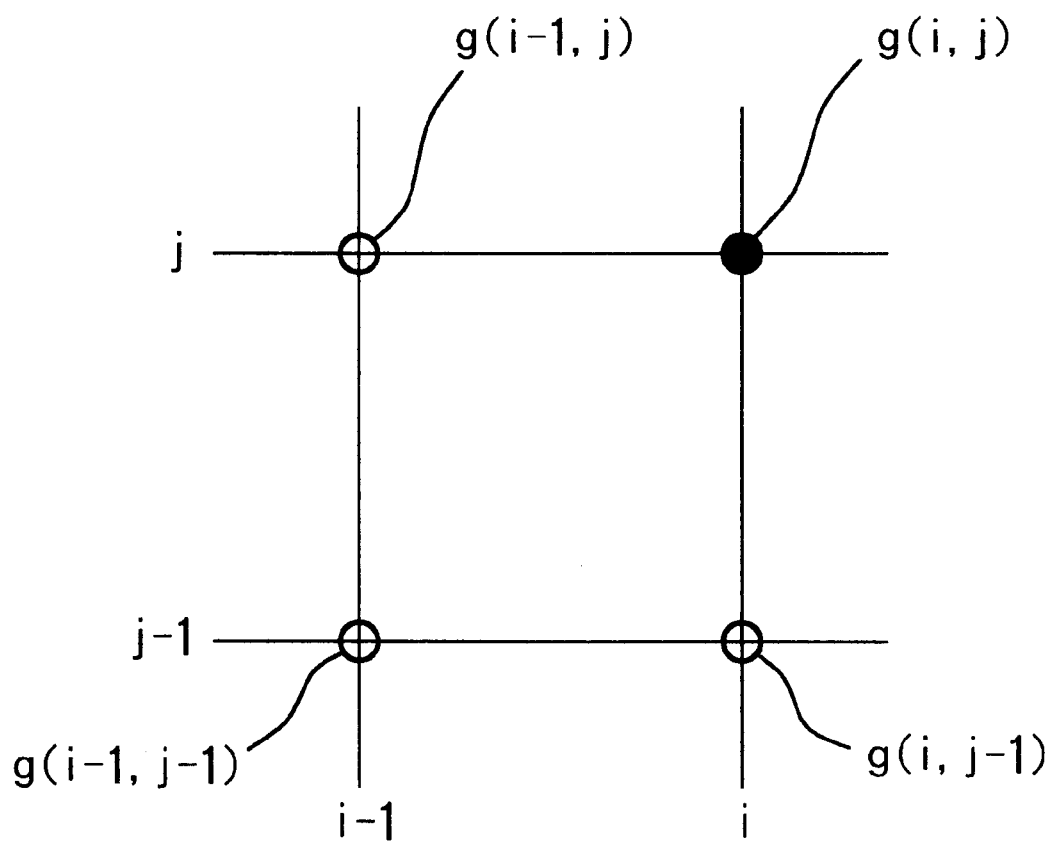

For example, the distance between label values at corresponding positions in the label strings of the retrieval specified image and the image to be compared is obtained with reference to the penalty matrix shown in FIG. 12, and the sum of distances for all labels in the label strings is calculated, thereby obtaining the distance between the label strings. In the example shown in FIG. 13A, the label string of the specified image is "112313441", and the label string of the image to be compared is "113224452". The distance (final solution) is obtained by performing DP matching using the penalty matrix shown in FIG. 12, as shown in FIG. 13B. In this example, the following condition is used as a gradient constraint, In FIG. 13C, when the costs on the lattice points (i−1,j), (i−1,j−1), and (i,j−1) are g(i−1,j), g(−1,j−1), and g(i,j−1), respectively, and the penalty on the lattice point (i,j) is d(i,j), the cost g(i,j) on the lattice point (i,j) is obtained by the following recurrence formula:

$$g(i, j) = \min \begin{cases} g(i, j-1) + d(i, j) \\ g(i-1, j-1) + 2d(i, j) \\ g(i-1, j) + d(i, j) \end{cases}$$

To give a small penalty (distance) to cells adjacent to each other or a large penalty to cells spaced apart from each other in pattern matching between labels, the penalty matrix between labels as shown in FIG. 12 is used. In step S24, the label strings are compared with each other in consideration of the penalty matrix. At this time, matching such as automaton which allows ambiguous comparison between label sequences may be performed. When such an ambiguous comparison method is used, a small penalty is given to excess label addition, label omission, or repeat of a label. In addition, when the distance between label strings is calculated using the penalty matrix between color labels shown in FIG. 12, ambiguous pattern matching can be performed. The "fuzzy nondeterministic finite automaton" described in "ambiguous character string retrieval method and system using fuzzy nondeterministic finite automaton" disclosed in Japanese Patent Laid-Open No. 8-241335 can be applied as the automaton. In this automaton, a multivalued distance (penalty) between symbols can be obtained. As a method which allows to ambiguously move the positions of labels to be compared to realize label string comparison such that the total distance is minimized (similarity is maximized), not only the above-described automaton but also DP matching used in speech recognition may be used. This method can also be preferably applied to this embodiment.

When the rule of block sequences in FIGS. 7A to 7C is employed in addition to the above-described ambiguous pattern matching, color label strings can be compared with each other while being less affected by any fine difference or shift in angle between the images to be compared and also less affected by a shift in both the vertical and horizontal directions. More specifically, DP matching or fuzzy nondeterministic automaton permits certain ambiguity in sequence of the label strings and absorbs the influence of a positional shift in image. When the position of the object changes due to the difference in angle, and the position of the object to be extracted changes depending on the block, the hue of the block is expected to finely change. This difference is absorbed by the above-described penalty matrix. As described above, by the synergy of DP matching or matching based on fuzzy automaton allowing ambiguity and the allowance of ambiguity in feature amounts by the penalty matrix, matching less affected by a shift in the vertical and horizontal direction is realized. In addition, since the change in label position due to a change in object position is minimized by employing oblique scanning shown in FIGS. 7A to 7C, the influence of a shift in object in matching can be more effectively minimized.

In step S25, an image search is made from the label system index using the label string with high similarity as a key, and the image ID of the found image is acquired. This processing is repeated for label strings output in descending order of similarities to obtain the image ID group of similar images. In step S26, the full path file name for each image ID of the image ID group is acquired with reference to the image management DB 18 and presented to the user.

With the above processing, some difference in color due to a change in image angle, object position, or photographing condition is absorbed, so robust similar image retrieval can be performed at a high speed.

As described above, according to the first embodiment, the feature amount group (group of feature amounts obtained by segmenting the feature amount space) is represented by one symbol (i.e., a label is generated), and a distance based on the similarity between labels is given on the basis of the penalty matrix. With this arrangement, the amount of calculation of the distance between two image blocks can be largely reduced. In addition, since similar feature amounts are represented by one label, similar image retrieval can be satisfactorily performed.

When (1) the concept of distance between labels based on the penalty matrix is introduced, and (2) a method such as DP matching or fuzzy nondeterministic automaton which allows to ambiguously move the positions of labels to be compared to realize label string comparison such that the total distance is minimized (similarity is maximized) is introduced, similar image retrieval can be performed even when the image angle slightly changes, so images having similar atmospheres can be retrieved.

Furthermore, according to this embodiment, the speed of image retrieval can be further increased by using the index database (label system index or label component index).

As described above, according to the present invention, similar image retrieval can be performed in consideration of the arrangement of the feature amounts of images.

[Second Embodiment]

In the first embodiment, similar image retrieval is performed by one-dimensionally arranging labels representing feature amounts, i.e., using a label string. In the second embodiment, similar image retrieval is performed in consideration of two-dimensionally arranged labels representing feature amounts, i.e., using a label matrix.

The control arrangement of an image retrieval apparatus according to the second embodiment is the same as that of the first embodiment (FIG. 1), and a detailed description thereof will be omitted.

FIG. 14 is a block diagram showing the functional arrangement of the image retrieval apparatus according to the second embodiment. The same reference numerals as in the first embodiment denote the game elements in FIG. 14, and a detailed description thereof will be omitted. A feature amount label matrix generation unit 15a generates a label matrix on the basis of feature amounts obtained by an image feature amount extraction unit 14. A pattern matching unit 16a calculates the similarity between the label matrix of a designated image and that of an image stored in an image storage unit 17 using two-dimensional DP matching (to be described later). An image management database (to be referred to as an image management DB hereinafter) 18a manages image data stored in the image storage unit 17 in the data format shown in FIG. 17. A label matrix index 19a stores a label system index shown in FIG. 18 or a label component index file shown in FIG. 20.

The operation of the image retrieval apparatus according to the second embodiment with the above arrangement will be described below. The following description will be made by exemplifying processing in a three-dimensional color space while employing colors, three colors of red (R), green (G), and blue (B), in this case, as image feature amounts, as in the first embodiment.

[Image Registration Processing]

Figure 15:
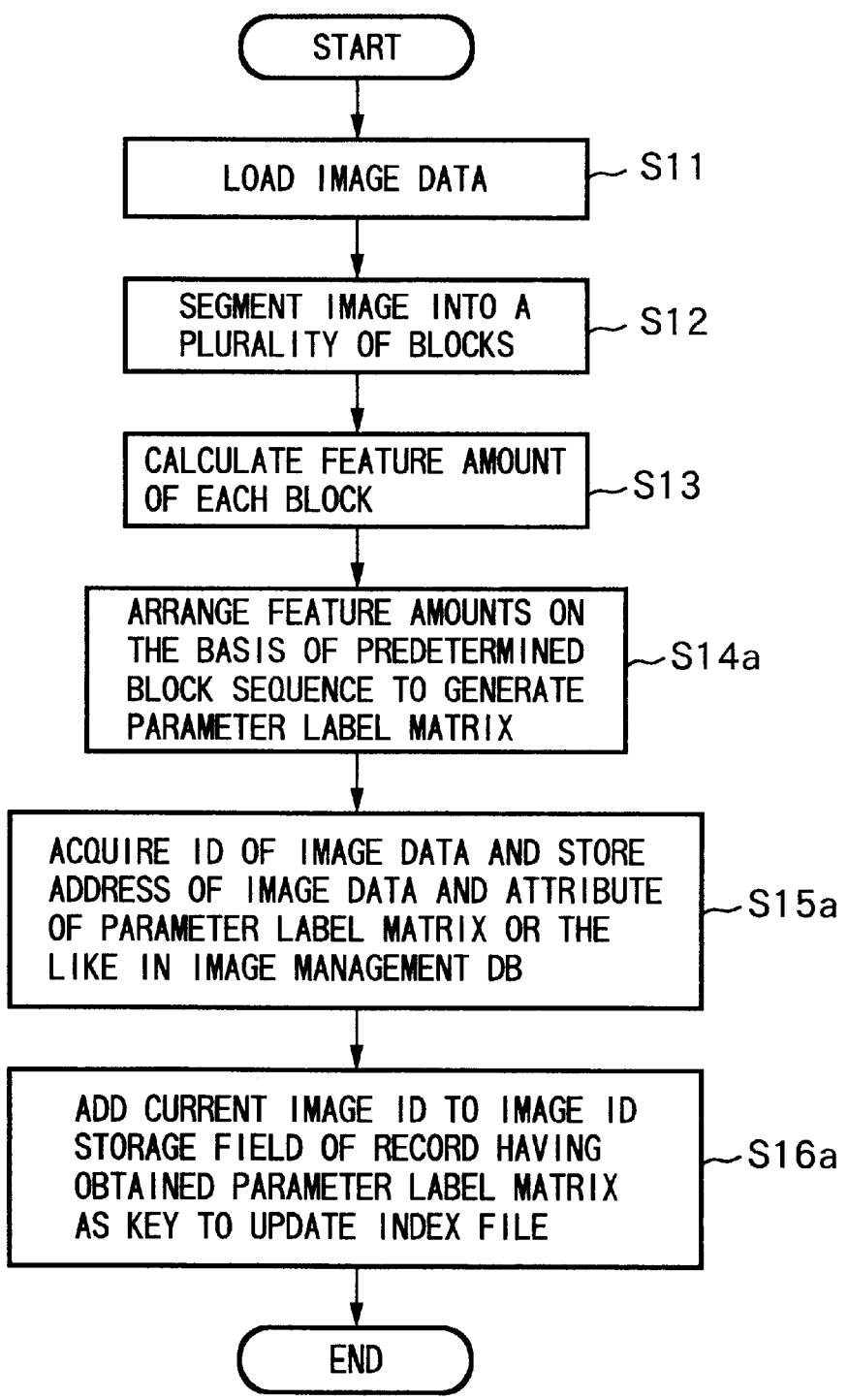
FIG. 15 is a flow chart showing the procedure of image registration processing according to the second embodiment.

FIG. 15 is a flow chart showing the procedure of image registration processing according to the second embodiment. Steps S11 to S13 in FIG. 15 are the same as those in the first embodiment (FIG. 4), and a detailed description thereof will be omitted.

With processing in steps S11 to S13, parameter labels are added to blocks. In step S14a, the parameter labels added to the blocks are arranged on the basis of a predetermined block sequence to generate a parameter label matrix (to be referred to as a label matrix hereinafter). FIGS. 16A to 16E are views for explaining block sequences in generating a label matrix. The parameter labels are arranged in accordance with numbers in the segmented image blocks to generate a label matrix. When a label matrix is to be stored in the image management DB 18a or label matrix index 19a, two-dimensional label matrixes are one-dimensionally arranged in a predetermined order and stored, as described above. In the second embodiment, this one-dimensional array will also be referred to as a label matrix.

In FIG. 16A, the segmented blocks are scanned in the horizontal direction from the left side to the right side, and this horizontal scanning is performed from the upper side to the lower side. The following scanning methods can be applied to this embodiment.

Horizontal scanning (not only horizontal scanning (FIG. 16A) in which scanning from the left side to the right side is performed from the upper side to the lower side, scanning methods shown in FIGS. 16B to 16D are also available; e.g., scanning from the left side to the right side is performed from the lower side to the upper side, so a total of four scanning methods are available).

Vertical scanning (four scanning methods are available; e.g., scanning from the upper side to the lower side is performed from the left side to the right side).

As shown in FIG. 16E, scanning is performed in units of even or odd lines.

In this embodiment, the scanning method shown in FIG. 16A is employed, although the above-described scanning methods can also be applied.

In step S15a, the label matrix and image data obtained in the above manner are stored in the image storage unit 17, the image management DB 18a, and the label matrix index 19a. More specifically, an image ID is acquired for image data loaded in step S11, and the image ID and image data are paired and stored in the image storage unit 17. An image management DB record shown in FIG. 17 is generated in correspondence with the image ID and registered in the image management DB 18a. In step S16a, the label matrix is registered in the label matrix index 19a having a record (label system index shown in FIG. 18) in which an image ID group is stored in a variable length record while setting the label matrixes as retrieval keys. If the label matrix has not been registered, a new record is generated, and a label matrix ID is added to the label matrix, so that the label matrix and corresponding image ID are registered. If the label matrix has already been registered, the image ID is additionally registered in the image ID group. By using such a label system index, an image ID corresponding to a given label matrix can be quickly obtained.

Image registration processing has been described above.

[Similar Image Retrieval Processing]

Figure 19:
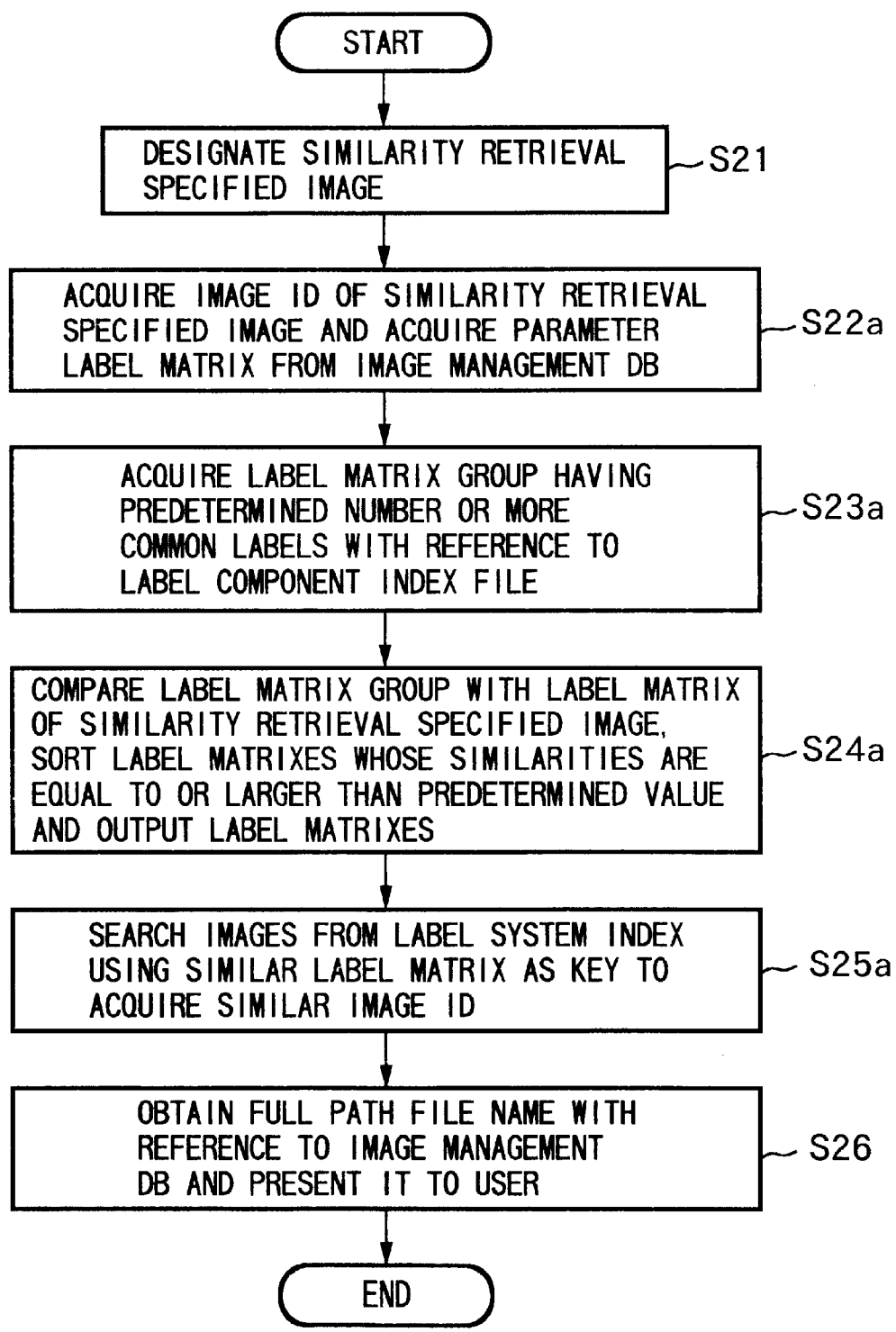
FIG. 19 is a flow chart for explaining the procedure of similar image retrieval according to the second embodiment

Similar image retrieval processing will be described next with reference to the flow chart in FIG. 19. FIG. 19 is a flow chart for explaining the procedure of similar image retrieval processing. In this embodiment, the label matrix group of already registered images is obtained from the label system index at the time of initialization in advance, and a label component index file having label components as keys is generated and stored in the label matrix index 19a. In this case, the time of initialization means the time of starting the system or the time of starting an application. Even when a new image is registered in the image DB, the label component index is generated. FIG. 20 is a view showing the data structure of the label component index. As shown in FIG. 20, each label component of the label component index has an address group (matrix ID group) corresponding to the label matrixes having the labels. The label component index file need not be regenerated until image registration, deletion, or change need be reflected to the label component index. Note that, the label component index may be added or updated when an image is registered.

In step S21, a similar image retrieval specified image is designated from a user interface unit 11. In step S22a, the image ID of the designated specified image is acquired, and the label matrix (color label matrix in this example) of the specified image is acquired from the image management DB 18a.

In step S23a, a label matrix group (label matrixes in the label system index) including a predetermined number or more labels having small penalties to the label matrix of the specified image is acquired with reference to the label component index file. As in the first embodiment, if the label matrix of the specified image is compared with all label matrixes of registered images, the processing speed lowers. To prevent this, similar label matrixes (label matrix group including a predetermined number or more labels similar to the label matrix of the specified image) are extracted in advance, and then, each of these label matrixes is compared with the label matrix of the specified image, thereby improving the processing speed. If a low processing speed is permitted, the label matrix of the specified image may be compared with all label matrixes of registered images to perform highly accurate retrieval (in this case, step S23a is omitted).

In step S24a, each of the label matrixes acquired in step S23a is compared to the label matrix of the specified image to calculate similarity. The label matrixes are sequentially output from the closest one to the label matrix of the specified image together with their similarities as a detection result.

The method of performing similarity comparison between label matrixes (calculation of similarity) will be described. The label matrix acquired in step S23a will be referred to as an image to be subjected to similarity comparison or image to be compared hereinafter.

In the second embodiment as well, the penalty matrix shown in FIG. 12 is used to compare label matrixes and obtain the similarity, as in the first embodiment.

More specifically, to give a small penalty (distance) to cells adjacent to each other or a large penalty to cells spaced apart from each other in pattern matching between labels, the penalty matrix between labels as shown in FIG. 12 is used. In step S24a, the label matrixes are compared with each other in consideration of the penalty matrix. In the second embodiment, two-dimensional DP matching (to be referred to as two-dimensional DP matching hereinafter) to be described below is used.

Figure 21:
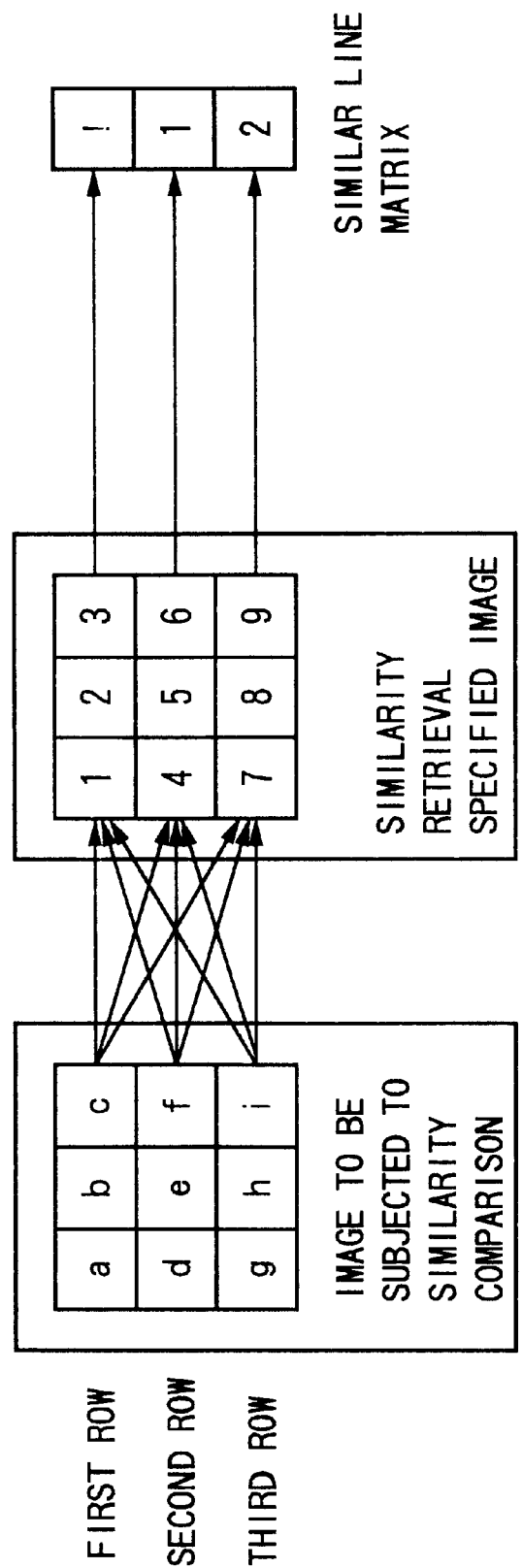
FIGS. 21A to 21C are views for explaining similarity calculation according to the second embodiment.

FIGS. 21A to 21C are views for explaining similarity calculation according to the second embodiment. The label matrix of the specified image, which is acquired in step S22a, can have an array (a) in FIGS. 21A to 21C in accordance with the scanning method. Assuming that one of the label matrixes extracted in step S23a is an image to be compared, the label matrix can have an array (b) in FIGS. 21A to 21C.

First, the distance between the label string "abc" of the first row of the image to be compared and each of the label strings of the first to third rows ("123", "456", and "789") of the specified image is obtained by DP matching. The row number of a label string in the specified image, which has the minimum distance, is stored at a corresponding position of a similar line matrix ((c) in FIGS. 21A to 21C). If the obtained minimum distance is larger than a predetermined threshold value, it is determined that the label string is not similar to any rows, and "!" is stored at the corresponding position of the similar line matrix. Even when the image angle slightly changes in the horizontal direction, a similar row (line) can be detected by the above processing because of the nature of DP matching. The above processing is repeated for all rows ("def" and "ghi") of the image to be compared, thereby obtaining a similar line matrix (c) in the column direction, as shown in FIGS. 21A to 21C.

The matrix (c) in FIGS. 21A to 21C indicate that no row similar to "abc" is present in the specified image, the first row of the specified image is similar to "def", and the second row of the specified image is similar to "ghi". The similarity between the similar line matrix obtained in the above manner and a standard line matrix (row array of the specified image: "123" in this example) is obtained using DP matching and output as the similarity between the specified image and the image to be compared. In DP matching, the label sequence to be compared is expanded/contracted (the label string to be compared with the label sequence is retained without advancing to the next one) and compared such that the similar distance of the label sequence to be compared is minimized, as is known. The position up to which expansion (retaining) is enabled may be given by a constraint condition (width of matching window).

Figure 22:
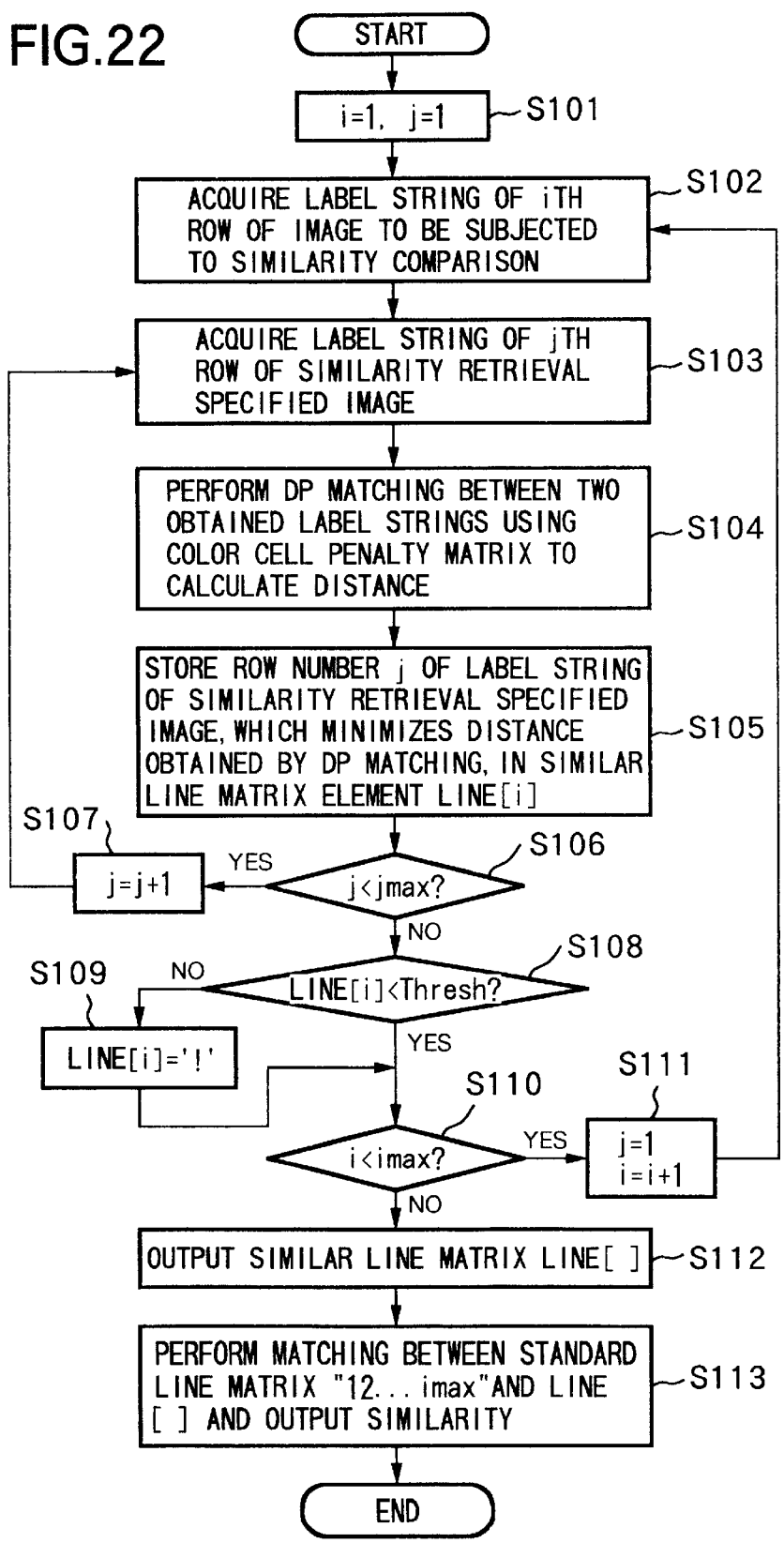
FIG. 22 is a flow chart for explaining the procedure of similarity calculation employing DP matching in the second embodiment.

FIG. 22 is a flow chart for explaining the procedure of similarity calculation employing DP matching in the second embodiment. Processing which has been described above with reference to FIGS. 21A to 21C will be described in more detail with reference to the flow chart in FIG. 22.

In step S101, a variable i representing the row number of the image to be compared and a variable j representing the row number of the specified image are initialized to "1" so that both variables represent the first rows. In step S102, the label string of the ith row of the image to be compared is acquired. In FIGS. 21A to 21C, if i=1, "abc" is acquired. In step S103, the label string of the jth row of the specified image is acquired. In FIGS. 21A to 21C, if j=1, "123" is acquired.

In step S104, the distance between the two label strings obtained in steps S102 and S103 is calculated by DP matching using the color cell penalty matrix described in FIG. 12. In step S104, if the minimum distance is obtained in association with the ith row in step S104, the corresponding row number (j) is stored in the line matrix element LINE[i].

Processing in steps S103 to S105 is performed for all rows of the specified image (steps S106 and S107). In this way, the number of one row of the specified image, which has the minimum distance from the label string of the ith row of the image to be compared, is stored in a line matrix element LINE[i].

In step S108, the line matrix element LINE[i] obtained by the above processing is compared with a predetermined threshold value (Thresh). If the line matrix element LINE[i] is equal to or larger than the threshold value Thresh, the flow advances to step S108, and "!" representing that the label string is not similar to any rows is stored in the line matrix element LINE[i].

Processing in steps S102 to S108 is repeated for all rows of the image to be compared (steps S110 and S111) to obtain line matrix elements LINE[1] to LINE[imax]. These line matrix elements are output as a similar line matrix LINE[ ].

In step S113, the standard line matrix [12 . . . imax] and the similar line matrix LINE[] are subjected to DP matching to calculate the distance between the two matrixes. Note that the standard line matrix means a matrix which starts from "1" and increases by one in the column direction.

The penalty used in DP matching between the standard line matrix and the similar line matrix will be described. Two penalty setting schema are available for DP matching between the standard line matrix and the similar line matrix in the column direction: a dynamic penalty and a static penalty.

In the dynamic penalty, the penalty between line numbers is dynamically set. The penalty between line numbers changes depending on the image. In this embodiment, the distance between two horizontal (row-direction) label matrixes of the specified image itself is calculated, and the penalty between rows is obtained on the basis of the distance between the label matrixes.

Figure 23:
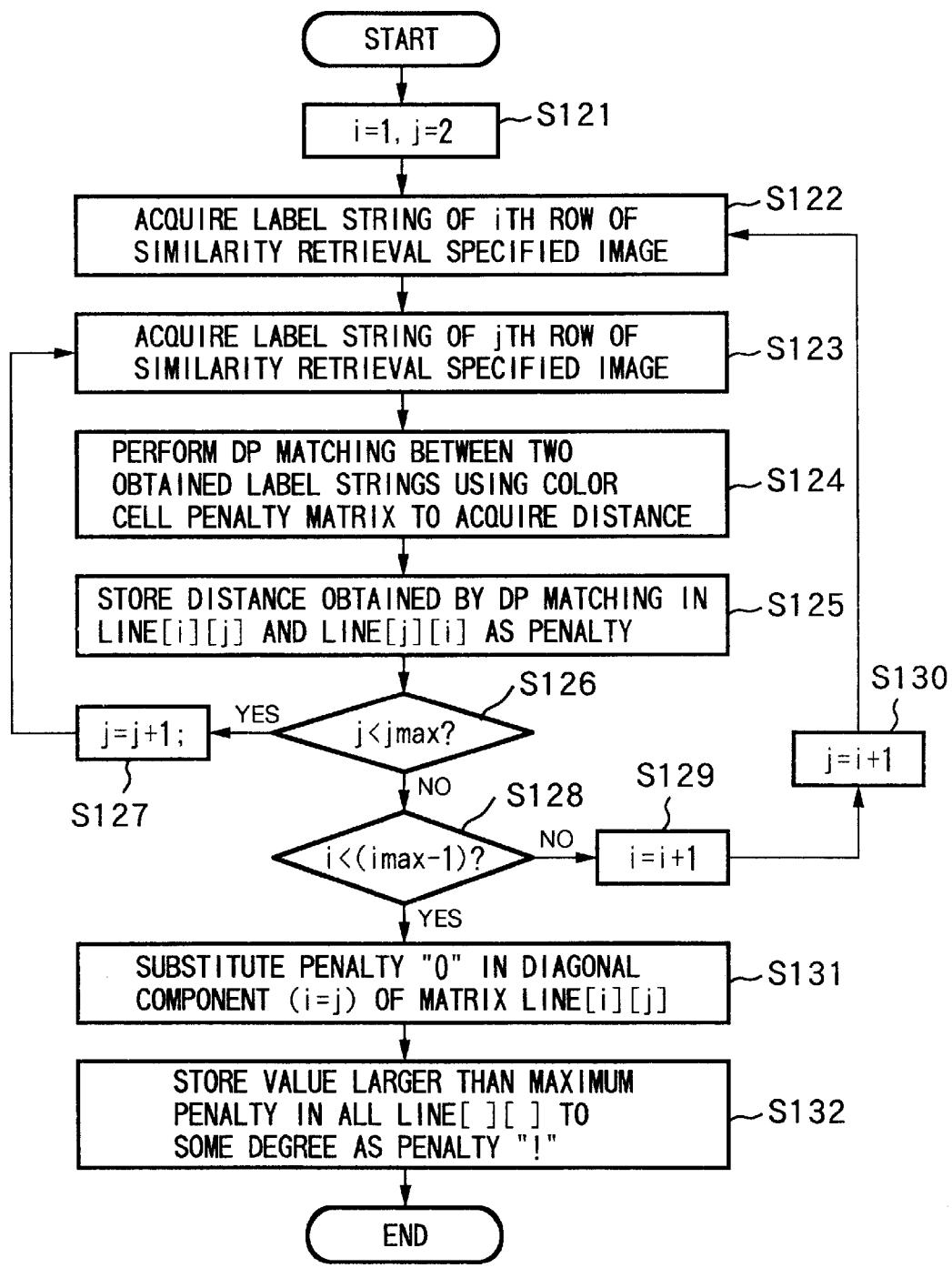
FIG. 23 is a flow chart showing the procedure of dynamic penalty value setting according to the second embodiment.

FIG. 23 is a flow chart showing the procedure of dynamic penalty value setting according to the second embodiment. In step S121, the variable i is set at "1", and the variable j is set at "2". In step S122, the label string of the ith row of the specified image is acquired. In step S123, the label string of the jth row of the specified image is acquired. In step S124, the label string of the ith row of the specified image and that of the jth row are subjected to DP matching using the color penalty matrix to acquire the distance between the label strings. In step S125, the DP matching distance obtained in step S124 is stored in the line matrix element LINE[i][j] as the penalty between the label string of the ith row of the specified image and that of the jth row, and simultaneously, stored in the line matrix element LINE[j][i] as the penalty between the label string of the jth row of the specified image and that of the ith row.

Processing in steps S122 to S108 is repeated until the variable j equals jmax in step S126. As a result, the penalty value between the label string of the ith row and each of the label strings of the (i+1) th to jmaxth rows is determined. Processing in steps S123 to S126 is repeated until the variable i equals imax—1 in steps S128, S129, and S130. As a result, the penalty values determined by the above processing are stored in the line matrix element LINE[i][j], excluding the diagonal component at i=j.

In step S131, the penalty of the diagonal component of the line matrix element LINE[i][j], which has not been determined by the above processing, is determined. Since i=j at this portion, i.e., the label strings are identical, the distance between the label strings is 0, and penalty "0" is stored. In step S132, the penalty for "!" is determined. As the penalty for "!", a value larger than the largest one of all the penalty values in the line matrix element LINE[i][j] to some degree is set. However, if the penalty value is made excessively large, ambiguous matching is disabled.

In the above manner, DP matching in step S113 is performed using the penalty values between the label strings of the specified image, thereby acquiring the similarity between the specified image and the image to be compared.

On the other hand, in the static penalty, if two labels match, penalty "0" is given as the penalty for DP matching; otherwise, or in case of comparison with "!", penalty having a certain value is given. In this case, the penalty does not change depending on the specified image. Processing in step S113 is executed using such a static penalty, thereby determining the similarity between the specified image and the image to be compared.

The above-described matching processing has the following characteristic features. If FIGS. 21A and 21B are considerably similar, the similar line matrix is "123", and the distance between the matrixes is 0. If the similar line matrix is "!12" or "212", it is likely that the image to be compared has been shifted to the lower side with respect to the specified image. If the similar line matrix is "23!" or "233", it is likely that the image to be compared has been shifted to the upper side with respect to the specified image. If the similar line matrix is "13!" or "!13", it is likely that the image to be compared is a reduced image of the specified image. If the image to be compared is an enlarged image of the specified image, it can also be detected.

As described above in step S113, when the similar line matrix and the standard line matrix are subjected to DP matching, a shift in the vertical direction is effectively absorbed. For this reason, the difference between the specified image and the image to be compared due to a shift to the upper or lower side, enlargement, or reduction of the image can be effectively absorbed, so satisfactory similarity retrieval can be performed.

More specifically, the two-dimensional DP matching of this embodiment allows certain ambiguity in sequence of label strings of the label matrix and absorbs the influence of the positional shift in image. When the object position changes due to the angle difference, or the position of the object to be extracted changes depending on the block, the hue of the block is expected to finely change. This difference is absorbed by the above-described penalty matrix. As described above, by the synergy of two-dimensional DP matching allowing the ambiguity in the second embodiment and the allowance of ambiguity in feature amounts by the penalty matrix, matching less affected by a shift in the vertical and horizontal direction, enlargement, or reduction is realized.

Of the dynamic penalty and the static penalty, the dynamic penalty is more preferable. For the specified image of, e.g., a boundless wheat field, all lines may have similar label strings. If the image to be compared also has the image of a boundless wheat field, the similar line matrix of this image may be "111" because the first line number "1" is stored at all positions. In this case, all lines of the specified image have similar images. For this reason, unless the penalty between line numbers is very small, matching at a small distance cannot be performed. However, when the dynamic penalty is used, the penalty between line numbers becomes small, so high similarity can be obtained.

On the other hand, when the static penalty is used, the penalty value between "123" and "111" is large, so the similarity is low.

In step S24a, the above-described similarity calculation is performed for all label matrixes acquired in step S23a. The obtained similarities are sorted in descending order, and the flow advances to step S25a. Instep S25a, an image search is made from the label system index using the label matrix with high similarity as a key, and the image ID of the found image is acquired. This processing is repeated for label matrixes output in descending order of similarities to obtain the image ID group of similar images. In step S26, the full path file name for each image ID of the image ID group is acquired with reference to the image management DB 18a and presented to the user.

As described above, when DP matching is performed in the horizontal and vertical directions, i.e., two-dimensionally, retrieval can be performed even when the image angle changes in the horizontal, vertical, or oblique direction, or the object moves. In addition, a zoom-in image or a macroimage can be retrieved because of the time-series expansion/contraction characteristics of DP matching.

In the second embodiment, a similar line matrix is obtained using label strings corresponding to block arrays in the horizontal direction. However, by the same method as described above, a similar line matrix can be obtained using label strings corresponding to block arrays in the vertical direction.

As described above, according to the second embodiment, the feature amount group (group of feature amounts obtained by segmenting the feature amount space) is represented by one symbol (i.e., a label is generated), and the distance based on the similarity between labels is given on the basis of the above-described two-dimensional DP matching and penalty matrix. With this arrangement, the amount of calculation of the distance between two image blocks can be largely reduced. In addition, since similar feature amounts are represented by one label, similar image retrieval can be satisfactorily performed.

When (1) the concept of distance between labels based on the penalty matrix is introduced, and (2) two-dimensional DP matching allowing to ambiguously move the positions of labels to be compared to realize label string comparison such that the total distance is minimized (similarity is maximized) is introduced, similar image retrieval can be performed even when the image angle slightly changes, so images having similar atmospheres can be retrieved.

Furthermore, according to this embodiment, the speed of image retrieval can be further increased by using an index database (label system index or label component index).

As described above, according to each of the above embodiments, similar image retrieval can be performed at a high speed in consideration of the arrangement of the feature amounts of images. Simultaneously, similar image retrieval can be performed while absorbing differences due to variation in photographing condition. Some difference in feature amount between images due to a change in image angle, object position, or photographing condition can be absorbed, unlike the prior art, so robust similar image retrieval can be performed.

As has been described above, according to the present invention, high-speed similar image retrieval can be performed in consideration of the arrangement of feature amounts of images. In addition, according to the present invention, similar image retrieval can be performed while effectively absorbing a change in image due to a variation in photographing condition such as a photographing angle or photographing magnification.

In each of the above embodiments, natural image retrieval has been described. However, it is obvious to a person skilled in the art that the present invention can be applied to retrieval of an artificial image of CG or CAD.

In each of the above embodiment, color information is selected as an image feature amount. However, the present invention is not limited to this and can be practiced by obtaining another image parameter in units of image segmented blocks.

In each of the above embodiments, recognition is made on the basis of one feature amount. However, high-speed retrieval based on a plurality of feature amounts can also be performed by Boolean operations of retrieval results based on various feature amounts.

By designating the degree of ambiguity to change the width of a so-called matching window in DP matching, a desired degree of ambiguity for retrieval can be set.

Figure 24:
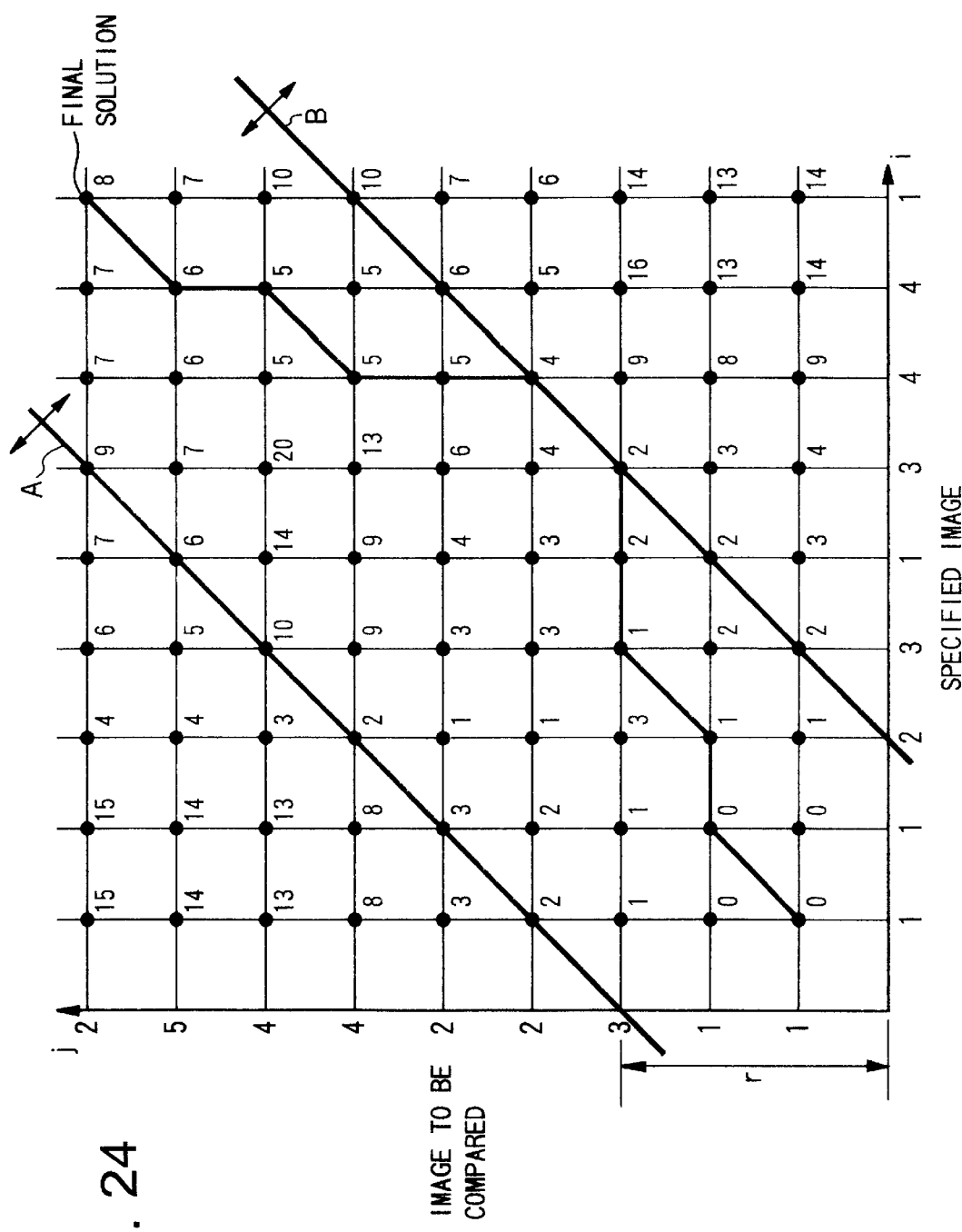
FIG. 24 is a view for explaining adjustment of width of matching window.

FIG. 24 explains adjustment of width of matching window of DP matching. As shown in FIG. 24, lines A and B define width of the matching window. The line A is defined by the equation i=j+r, the line B is defined by the equation i=j−r. The width of the matching window can be determined by value r. Therefore, a desired width of the matching window can be set by designating the value r from the keyboard 104. Note that, the value r for the line A and the value r for the line B may be different from each other.

Furthermore, according to the above embodiments, the label component index and the label component index are utilized. However, it is apparent that retrieval of similar images can be achieved without utilizing such indexes.

When retrieval is to be performed for one image using a plurality of image feature amounts, the similarity obtained in the present invention may be regarded as a new feature amount, and retrieval using statistical distance may be performed by multivariate analysis using a plurality of parameters. In each of the above embodiments, a similar image having a similarity larger than a predetermined value is obtained as a retrieval result. However, a predetermined number of images may be sequentially output from an image with high similarity as retrieval results, as a matter of course.

The present invention may be applied to a system constituted by a plurality of devices, e.g., a host computer, an interface device, a reader, or a printer, or an apparatus comprising a single device (e.g., a copying machine, a facsimile apparatus, or the like)

The object of the present invention is realized even by supplying a storage medium storing software program codes for realizing the functions of the above-described embodiments to a system or an apparatus, and causing the computer (or a CPU or an MPU) of the system or apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk, a hard disk, an optical disk, a magnetooptical disk, a CD-ROM, a CD-R, a magnetic tape, a nonvolatile memory card, a ROM, or the like can be used.

The functions of the above-described embodiments are realized not only when the readout program codes are executed by the computer but also when the OS (Operating System) running on the computer performs part or all of actual processing on the basis of the instructions of the program codes, as a matter of course.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes, as a matter of course.

As many apparently widely different embodiments of the present invention can be made without departing from the spirit and scope thereof, it is to be understood that the invention is not limited to the specific embodiments thereof except as defined in the appended claims.

What is claimed is:

1. An image retrieval apparatus comprising:
   a storage adapted to store a label string which represents a two dimensional label matrix in correspondence with an image;
   a specifying unit, adapted to specify an image;
   an acquiring unit, adapted to acquire the label matrix of the specified image from said storage; and
   a retrieval unit adapted to perform image retrieval on the basis of the label matrix stored in said storage, said retrieval unit including:
   a first matching unit adapted to compare a label string extracted from the label matrix of the specified image in units of rows with a label string extracted from the label matrix of an image to be compared in units of rows by dynamic programming matching to obtain a row array indicating to which row of the image to be compared each row of the specified image is similar; and
   a second matching unit adapted to obtain, by dynamic programming matching, a similarity between a row array of the image to be compared and the row array obtained by said first matching unit.

2. The apparatus according to claim 1, wherein the label string extracted in units of rows has an array in the horizontal direction of the image.

3. The apparatus according to claim 1, wherein the label string extracted in units of rows has an array in the vertical direction of the image.

4. The apparatus according to claim 1, further comprising an output unit adapted to output, as a retrieval result, an image whose similarity obtained by said second matching unit exceeds a predetermined value.

5. The apparatus according to claim 1, wherein said first matching unit has a table which holds a penalty value for a pair of labels, and refers to the table in calculating a distance between the label string of the retrieval specified image and the label string of the image to be compared using DP matching.

6. The apparatus according to claim 5, wherein
the label is unique to each cell obtained by segmenting a multidimensional feature amount space into a plurality of cells, and
the penalty value is set on the basis of a distance between cells represented by two labels.

7. The apparatus according to claim 1, wherein said second matching unit has a table which holds a penalty value for a pair of row numbers of the row array and refers to the table in calculating the similarity between the row array of the retrieval specified image and the row array of the image to be compared using DP matching.

8. The apparatus according to claim 1, further comprising
a holding unit adapted to determine a penalty value associated with a pair of rows on the basis of the similarity between label strings in a row direction of the retrieval specified image and holding the penalty value, and
wherein said second matching unit refers to the penalty value held by said holding unit in calculating the similarity between the row array of the retrieval specified image and the row array of the image to be compared using DP matching.

9. The apparatus according to claim 5, wherein said first matching unit applies a penalty and constraint according to system expansion/contraction in label comparison in calculating the similarity between the label string of the retrieval specified image and the label string stored in said storage.

10. The apparatus according to claim 9, wherein
the penalty and constraint according to system expansion/contraction in label comparison are acquired on the basis of a DP matching theory.

11. The apparatus according to claim 5, further comprising
a first table for registering an image ID group having label strings generated by said generation unit as keys, and
wherein said output unit acquires a label string whose similarity calculated by said retrieval unit exceeds a predetermined value, extracts an image corresponding to the acquired label string with reference to the first table, and outputs the image as a retrieval result.

12. The apparatus according to claim 11, wherein
the label matrix subjected to similarity calculation by said retrieval unit is a key in the first table.

13. The apparatus according to claim 11, wherein
the label matrix subjected to similarity calculation by said retrieval nit is one of label matrixes stored in said storage, which includes a predetermined number or more labels similar to those in the label matrix of the retrieval specified image.

14. The apparatus according to claim 13, further comprising
a second table for registering a label matrix group of label matrixes stored in said storage, which includes labels as keys, and wherein a label matrix including a predetermined number or more labels similar to those included in the specified image is acquired with reference to the second table and subjected to similarity calculation by said arithmetic unit.

15. The apparatus according to claim 1, wherein said retrieval unit utilizes a DP-matching method,
and further comprising:
a setting unit adapted to set width of a matching window of the DP-matching performed by said retrieval, and
a controller adapted to control ambiguity of said retrieval unit by changing the width of the matching window based on the width set by said setting unit.

16. An image retrieval method, comprising:
a storage step, of storing, in a storage, a label string which represents a two dimensional label matrix, in correspondence with an image;
a specification step, of specifying an image;
an acquisition step, of acquiring the label matrix of the specified image from the storage; and
an image retrieval step, of performing image retrieval on the basis of the label matrix stored in the storage, the image retrieval including:
a first matching step, of comparing a label string extracted from the label matrix of the specified image in units of rows with a label string extracted from the label matrix of an image to be compared in units of rows by dynamic programming matching to obtain a row array indicating to which row of the image to be compared each row of the specified image is similar; and
a second matching step, of obtaining, by dynamic programming matching, a similarity between a row array of the image to be compared and the row array obtained in said first matching step.

17. The method according to claim 16, wherein the label string extracted in units of rows has an array in the horizontal direction of the image.

18. The method according to claim 16, wherein
the label string extracted in units of rows has an array in the vertical direction of the image.

19. The method according to claim 16, further comprising an output step, of outputting, as a retrieval result, an image whose similarity obtained in said second matching step exceeds a predetermined value.

20. The method according to claim 16, wherein said first matching step uses a table which holds a penalty value for a pair of labels, and includes referring to the table in calculating a distance between the label string of the retrieval specified image and the label string of the image to be compared using DP matching.

21. The method according to claim 20, wherein
the label is unique to each cell obtained by segmenting a multidimensional feature amount space into a plurality of cells, and
the penalty value is set on the basis of a distance between cells represented by two labels.

22. The method according to claim 16, wherein the second matching step uses a table which holds a penalty value for a pair of row numbers of the row array and includes referring to the table in calculating the similarity between the row array of the retrieval specified image and the row array of the image to be compared using DP matching.

23. The method according to claim 16, further comprising
a holding step, of determining a penalty value associated with a pair of rows on the basis of the similarity between label strings in a row direction of the retrieval specified image and holding the penalty value, and wherein said second matching step includes referring to the penalty value held in the holding step in calculating the similarity between the row array of the retrieval specified image and the row array of the image to be compared using DP matching.

24. The method according to claim 20, wherein the first matching step includes applying a penalty and constraint according to system expansion/contraction in label comparison in calculating the similarity between the label string of the retrieval specified image and the label string stored in the storage step.

25. The method according to claim 24, wherein the penalty and constraint according to system expansion/contraction in label comparison are acquired on the basis of a DP matching theory.

26. The method according to claim 20, wherein a first table is used for registering an image ID group having label strings generated in the generation step as keys, and wherein the output step includes acquiring a label string whose similarity calculated in the retrieval step exceeds a predetermined value, extracting an image corresponding to the acquired label string with reference to the first table, and outputting the image as a retrieval result.

27. The method according to claim 26, wherein the label matrix subjected to similarity calculation in the retrieval step is a key in the first table.

28. The method according to claim 26, wherein the label matrix subjected to similarity calculation in the retrieval step is one of label matrixes stored in the storage step, which includes a predetermined number or more labels similar to those in the label matrix of the retrieval specified image.

29. The method according to claim 28, further comprising a second table for registering a label matrix group of label matrixes stored in the storage step, which includes labels as keys, and in that wherein a label matrix including a predetermined number or more labels similar to those included in the specified image is acquired with reference to the second table and subjected to similarity calculation in the arithmetic step.

30. The method according to claim 16, wherein DP-matching method is utilized in said retrieval step, and further comprising:

a setting step, of setting width of a matching window of the DP-matching performed in said retrieval step, and a controlling step, of controlling ambiguity in said retrieval step by changing the width of the matching window based on the width set in said setting step.

31. A memory medium storing computer-executable instructions for performing an image retrieval method, comprising:

a storage step, of storing, in a storage, a label string which represents a two dimensional label matrix, in correspondence with an image;

a specification step, of specifying an image;

an acquisition step, of acquiring the label matrix of the specified image from the storage; and an image retrieval step, of performing image retrieval on the basis of the label matrix stored in the storage, the image retrieval including:

a first matching step, of comparing a label string extracted from the label matrix of the specified image in units of rows with a label string extracted from the label matrix of an image to be compared in units of rows by dynamic programming matching to obtain a row array indicating to which row of the image to be compared each row of the specified image is similar; and a second matching step, of obtaining, by dynamic programming matching, a similarity between a row array of the image to be compared and the row array obtained in said first matching step.

* * * * *

UNITED STATES PATENT AND TRADEMARK OFFICE
CERTIFICATE OF CORRECTION

PATENT NO. : 6,400,853 B1
DATED : June 4, 2002
INVENTOR(S) : Hirotaka Shiiyama

It is certified that error appears in the above-identified patent and that said Letters Patent is hereby corrected as shown below:

Title page,
Item [56], FOREIGN PATENT DOCUMENTS,
"JP 8241335    should  -- JP 8-241335
JP 8249349"   read      JP 8-249349 --.

Column 2,
Line 28, "automaton" should read -- automation --.

Column 3,
Line 22, "embodiment" should read -- embodiment; --.

Column 5,
Line 55, "available). In" should read -- available).¶In --.

Column 7,
Line 49, "g(i-1, j-1)," should read -- g(i-1, j-1), --.

Column 9,
Line 34, "data." should read -- data --; and
Line 52, "Instep" should read -- In step --.

Column 12,
Line 29, "S104," should read -- S105, --.

Column 13,
Line 16, "S122 to S108" should read -- S123 to S125 --.

Column 14,
Line 33, "Instep" should read -- In step --.

Column 15,
Line 55, "label component index" (first instance) should read -- label system index --.

Column 16,
Line 5, "like)" should read -- like). --;
Lines 56 and 61, "programming" should read -- programming (DP) --.

UNITED STATES PATENT AND TRADEMARK OFFICE
CERTIFICATE OF CORRECTION

PATENT NO. : 6,400,853 B1
DATED : June 4, 2002
INVENTOR(S) : Hirotaka Shiiyama

It is certified that error appears in the above-identified patent and that said Letters Patent is hereby corrected as shown below:

Column 17,
Line 59, "nit" should read -- unit --.

Column 18,
Lines 28 and 34, "programming" should read -- programming (DP) --.

Column 20,
Line 1, "wherein" should be deleted;
Lines 32 and 37, "programming" should read -- programming (DP) --.

Signed and Sealed this

First Day of July, 2003

JAMES E. ROGAN
*Director of the United States Patent and Trademark Office*